(12) United States Patent
Homma

(10) Patent No.: US 10,972,669 B2
(45) Date of Patent: Apr. 6, 2021

(54) OPERATION APPARATUS, OPTICAL APPARATUS, AND IMAGING APPARATUS

(71) Applicant: CANON KABUSHIKI KAISHA, Tokyo (JP)

(72) Inventor: Taiki Homma, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 118 days.

(21) Appl. No.: 16/024,467

(22) Filed: Jun. 29, 2018

(65) Prior Publication Data

US 2019/0014268 A1  Jan. 10, 2019

(30) Foreign Application Priority Data

Jul. 4, 2017  (JP) .............................. JP2017-131390

(51) Int. Cl.
*H04N 5/232*  (2006.01)

(52) U.S. Cl.
CPC ... *H04N 5/232933* (2018.08); *H04N 5/23212* (2013.01); *H04N 5/23216* (2013.01); *H04N 5/23245* (2013.01); *H04N 5/23296* (2013.01); *H04N 5/232127* (2018.08); *H04N 5/232939* (2018.08); *H04N 5/232945* (2018.08)

(58) Field of Classification Search
CPC ......... H04N 5/23212; H04N 5/232127; H04N 5/23245; H04N 5/232933; H04N 5/232945; H04N 5/23216; H04N 5/232939; H04N 5/23296
See application file for complete search history.

(56) References Cited

U.S. PATENT DOCUMENTS

| | | | | |
|---|---|---|---|---|
| 6,724,429 B2* | 4/2004 | Shore | ..................... | G03B 13/20 |
| | | | | 348/373 |
| 9,253,407 B2* | 2/2016 | Heo | ........................ | G06F 3/0482 |
| 10,136,067 B2* | 11/2018 | Takahashi | .......... | H04N 5/23212 |
| 2016/0026371 A1* | 1/2016 | Lu | ........................ | G06F 3/04886 |
| | | | | 715/765 |

FOREIGN PATENT DOCUMENTS

| | | | |
|---|---|---|---|
| JP | 2004-287180 A | | 10/2004 |
| JP | 2004287180 A | * | 10/2004 |

* cited by examiner

*Primary Examiner* — Lin Ye
*Assistant Examiner* — Chriss S Yoder, III
(74) *Attorney, Agent, or Firm* — Canon U.S.A., Inc. IP Division

(57) ABSTRACT

An operation apparatus for operating an optical element movable for changing an optical characteristic of an optical apparatus includes an operation member, a detector configured to detect an operation amount of the operation member, a controller configured to generate an operation command for the optical element based on the operation amount, and a memory configured to store an operation target for the optical element. The controller is configured to cause a display to display the operation command and the operation target in a first region of the display corresponding to a range which the operation command can take, and the operation command and the operation target in a second region of the display corresponding to a partial region in the first region and larger than the partial region.

16 Claims, 20 Drawing Sheets

FIG.2

| Focus memory setting | | |
|---|---|---|
| Memory1 | : | 100 |
| Memory2 | : | 400 |

- 301 NUMERICAL DISPLAY AREA
- 302 WHOLE RANGE DISPLAY AREA
- 303 ENLARGED DISPLAY AREA
- 304 OPERATION TARGET VALUE INDICES
- 305 OPERATION COMMAND VALUE INDEX

FIG.5

| Focus memory setting | | |
|---|---|---|
| Memory1 | : | 100 |
| Memory2 | : | 400 |
| Enlarged Area | : | ±100 |
| Match Area | : | ±10 |

FIG.11

| Focus memory setting | | |
|---|---|---|
| Memory1 | : | 450 |
| Memory2 | : | 800 |

FIG.15

| Focus memory setting | | |
|---|---|---|
| Memory1 | : | 450 |
| Memory2 | : | 800 |
| Fine Area | : | ±10 |
| Fine Level | : | Mid |
| (Min/Mid/Max/Auto) | | |

OPERATION APPARATUS, OPTICAL APPARATUS, AND IMAGING APPARATUS

BACKGROUND

Field of the Disclosure

The present disclosure relates to an operation apparatus, an optical apparatus, and an imaging apparatus.

Description of the Related Art

A television lens system is known, which pre-stores a subject distance (focus position) to be used in imaging and displays the closeness of the stored subject distance and the current subject distance to make it easier to reproduce the stored subject distance (Japanese Patent Application Laid-Open No. 2004-287180).

A technique discussed in Japanese Patent Application Laid-Open No. 2004-287180 may cause a problem in visibility of information indicating the closeness between the stored subject distance and the current subject distance, for example, if the size of a display device is limited. More specifically, in a state where the entire range of the subject distance is displayed on a small display device, if an operation member is operated to change the subject distance, the displayed subject distance (or the closeness) is only minutely changed. Therefore, the technique is disadvantageous with respect to visibility of the closeness and hence operability of the operation member (movable optical element for changing the subject distance).

SUMMARY

The present invention provides, for example, an operation apparatus advantageous in operability for an optical element in a vicinity of an operation target thereof.

According to an aspect of the present invention, an operation apparatus for operating an optical element movable for changing an optical characteristic of an optical apparatus includes an operation member, a detector configured to detect an operation amount of the operation member, a controller configured to generate an operation command for the optical element based on the operation amount, and a memory configured to store an operation target for the optical element. The controller is configured to cause a display to display the operation command and the operation target in a first region of the display corresponding to a range which the operation command can take, and the operation command and the operation target in a second region of the display corresponding to a partial region in the first region and larger than the partial region.

Further features of the present invention will become apparent from the following description of exemplary embodiments with reference to the attached drawings.

BRIEF DESCRIPTION OF THE DRAWINGS

FIG. 2 illustrates an example of a setting screen.

FIG. 5 illustrates an example of a setting screen according to a second exemplary embodiment.

FIG. 11 illustrates an example of a setting screen.

FIG. 15 illustrates an example of a setting screen according to a sixth exemplary embodiment.

DESCRIPTION OF THE EMBODIMENTS

Figure 1:
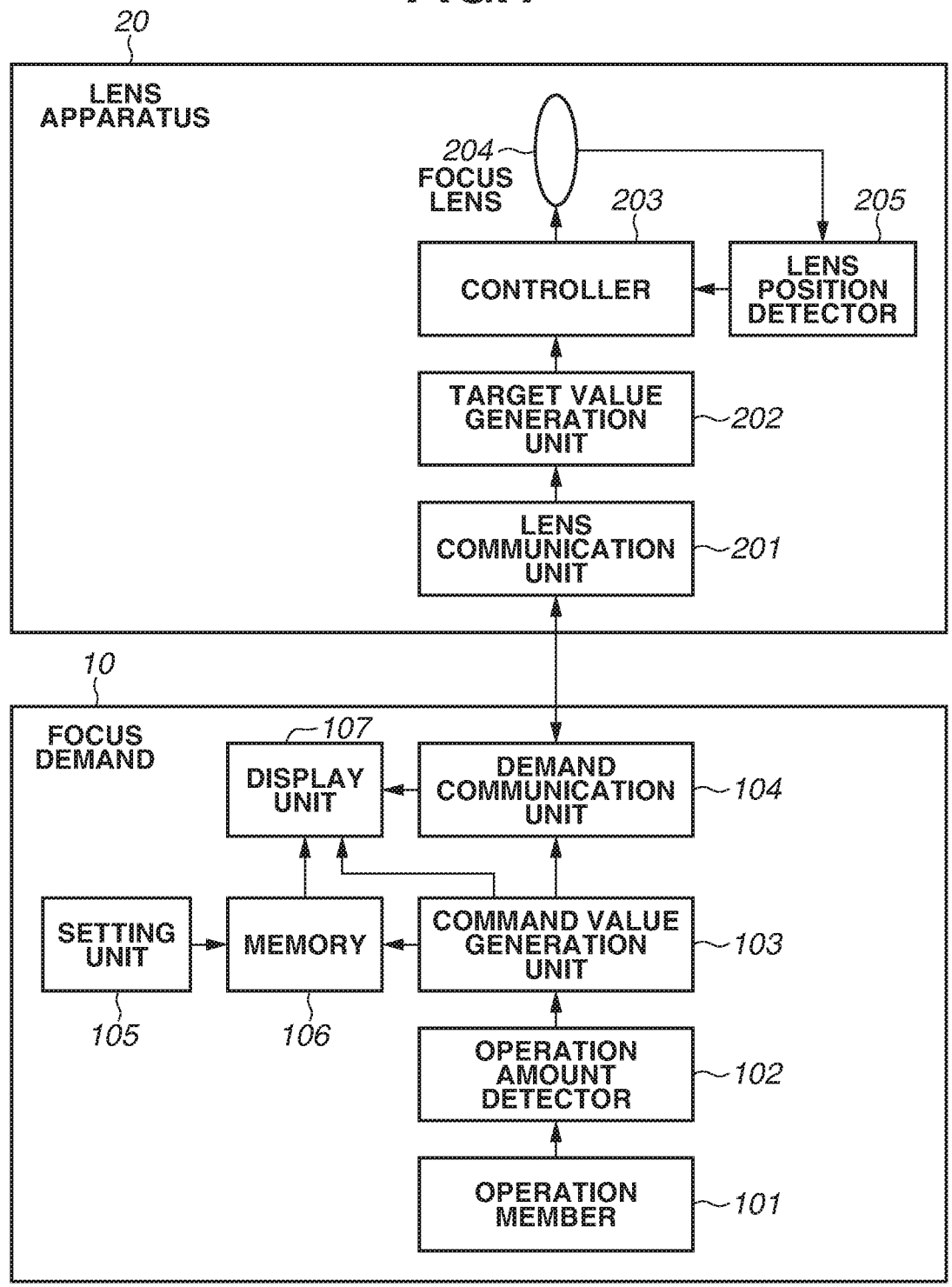
FIG. 1 illustrates examples of configurations of a lens apparatus and an operation apparatus according to a first exemplary embodiment.

Exemplary embodiments of the present invention will be described below with reference to the accompanying drawings. Through all of the drawings for illustrating exemplary embodiments, as a general rule (unless otherwise specifically described), identical members are assigned the same reference numerals and duplicated descriptions thereof will be omitted.

A first exemplary embodiment will be described below with reference to FIGS. 1 to 4. FIG. 1 illustrates examples of configurations of a lens apparatus and an operation apparatus according to the first exemplary embodiment. The configuration includes a focus demand 10 as an operation apparatus and a lens apparatus 20 as an optical apparatus. The operation apparatus (the focus demand 10 in this case) is used to operate an optical element (a focus lens 204 (described below) in this case) movable for changing an optical characteristic (a subject distance in this case) of the optical apparatus (the lens apparatus 20 in this case).

An operation member 101 in this case is used by a photographer to operate a focus lens (described below) and may be, for example, a rotatably operable knob. An operation amount detector 102 may include, for example, a potentiometer or rotary encoder and detects the operation amount (operation position) of the operation member 101. A command value generation unit 103 (a command generation unit) generates a focus operation command value (an operation command) based on an output (the above-described operation amount) from the operation amount detector 102.

The command value generation unit 103 functions also as a main controller (also simply referred to as a controller). A demand communication unit 104 encodes the focus operation command value generated by the command value generation unit 103 into a code conforming to a specific communication protocol and transmits the code to a lens communication unit 201 of the lens apparatus 20. The demand communication unit 104 may receive specific information, for example, position information of the focus lens 204 (described below), from the lens communication unit 201.

A setting unit 105 (a setting device) including switches, such as a cross key and a determination key, has a function of setting an operation target value (an operation target) of an optical element to be stored in a storage unit 106 (described below). The operation target value to be set may be the current focus operation command value generated by the command value generation unit 103 or a value arbitrarily specified by a user. Further, the setting unit 105 may be configured to enable editing or deleting of a stored operation target value. The storage unit 106 includes, for example, a nonvolatile memory and stores the operation target value set by the setting unit 105. Information stored in the storage unit 106 may be read through a display-related request to a display unit 107 (a display; described below). The display unit 107 may include a display device such as an electroluminescence (EL) display and a liquid crystal display (LCD) and may display the entire area (region) corresponding to the entire range of the value which the operation command value can take, and display the operation command value and operation target value in the entire area. Further, the display unit 107 displays a screen for making a setting with the setting unit 105. A touch panel device may be used as the display unit 107. In this case, the display unit 107 forms the setting unit 105 and is useful for easily setting (editing) an operation target value even without operating the operation member 101 and the above-described switches. Information set, stored, and displayed by the setting unit 105, the storage unit 106, and the display unit 107 is not limited to information based on the focus operation command value. The information may be based on the operation amount detected by the operation amount detector 102 or based on the position of the focus lens 204 received by the demand communication unit 104.

The lens apparatus 20 includes the lens communication unit 201, which transmits and receives commands or information conforming to a specific communication protocol to/from the demand communication units 104. Upon reception of a code related to a command including the focus operation command value, the lens communication unit 201 decodes the received code and transmits the acquired operation command value to a target value generation unit 202 (a target generation unit). The target value generation unit 202 generates a control target value (a control target; a target position of the focus lens 204) for controlling the position of the focus lens 204 based on the operation command value and transmits the control target value to the control unit 203. The control unit 203 controls the position of the focus lens 204 based on the control target value generated by the target value generation unit 202. The focus lens 204 is a movable optical element for changing the optical characteristic (subject distance in this case) of the optical apparatus (lens apparatus in this case). The lens position detector 205 detects the position of the focus lens 204. A signal of the position detected by the lens position detector 205 is input to the control unit 203. The control unit 203 and the lens position detector 205 perform feedback control on the position of the focus lens 204.

FIG. 2 illustrates an example of a setting screen displayed on the display unit 107. This screen is displayed to allow the setting unit 105 to make a setting. In this case, the values of Memory1 and Memory2 are set as operation target values. The number of points for operation target values to be set is not limited to two and may be one or larger arbitrary number. Operation target values may be set through the current focus operation command value or set by directly inputting a numerical value. The numerical value set via the focus operation command value may be changed by directly inputting a numerical value. Each of Memory1 and Memory2 is represented by a value normalized with a lower limit (closest point) of zero and an upper limit (infinite point) of 1000 of the focus operation command value. Each of the setting values may be the value of the subject distance (imaging distance) itself.

Figure 3A:
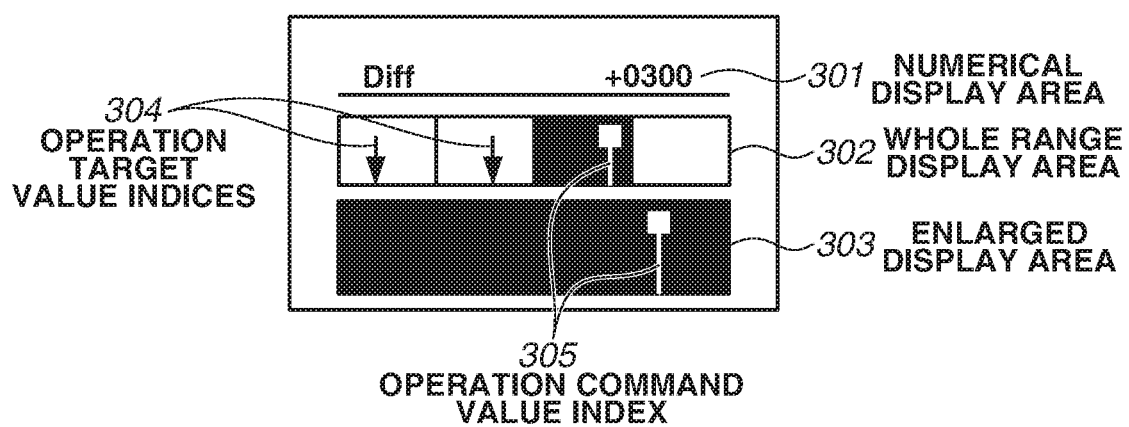
FIGS. 3A and 3B illustrate examples of display screens.
Figure 3B:
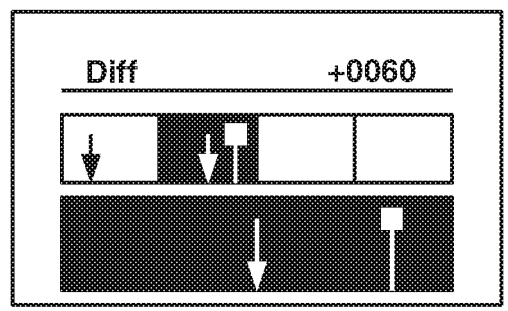

FIGS. 3A and 3B illustrate examples of display screens on the display unit 107. These screens are displayed when a user is operating the operation member 101. The display screens display the current focus operation command value and operation target values. The difference (difference amount) between the current focus operation command value and an operation target value is represented by a numerical value and index (mark). According to the present exemplary embodiment, the display contents are changed based on the current focus operation command value. FIG. 3A illustrates an example of a display screen in a case where an operation target value index 304 is not displayed in an enlarged display area 303 (described below) because of a large difference between the focus operation command value and the operation target value.

In the display screen, a numeric display area 301 numerically displays the difference between the current focus operation command value and the operation target value. However, when (in a case where) a plurality of operation target values is set, the numeric display area 301 displays the difference between the focus operation command value and the operation target value closest thereto. Similar to FIG. 2, the focus operation command value is represented by a value normalized with a lower limit (closest point) of zero and an upper limit (infinite point) of 1000. However, the numerical value may be a subject distance acquired through communication with the lens apparatus 20. A whole range display area 302 (first area) is an area for displaying the entire area (corresponding to the entire range which the operation command value can take) with a lower limit of zero and an upper limit of 1000 of the focus operation command value. According to the present exemplary embodiment, the whole range display area 302 is divided into a plurality of areas (four areas in this case). Of the four areas, an area to which the current focus operation command value belongs will be enlarged and displayed in the enlarged display area 303 (second area) described below. The area displayed in the enlarged display area 303 is displayed with the inverted gradation in the whole range display area 302. Although the number of area divisions is four in the present case, this number may be changed by the user. The number of divisions is suitably selected based on the size of the display device configuring the display unit 107. In addition, the number of divisions may also be changed based on imaging conditions in the lens apparatus 20.

When the operation command value (operation amount) falls within a predetermined partial area (for example, one of the above-described four areas) in the entire area, the enlarged display area 303 enlarges and displays the partial area, and displays the operation command value in the enlarged and displayed partial area. Then, when an operation target value and the operation command value fall within a predetermined partial area of the entire area, the command value generation unit 103 enlarges and displays the partial area on the display unit 107. The command value generation unit 103 also displays the operation command value and operation target value in the enlarged and displayed partial area on the display unit 107. According to the present exemplary embodiment, similar to the area subjected to the enlarged display in the whole range display area 302, the display in the enlarged display area 303 is performed with the inverted gradation. This makes it possible to indicate in an intuitive manner, which area in the entire area (entire range) displayed in the whole range display area 302 is enlarge-displayed in the enlarged display area 303. A similar effect can also be acquired by differentiating the display color instead of highlighting the gradation. The whole range display area 302 and the enlarged display area 303 can display the information about the subject distance itself through communication with the lens apparatus 20.

The operation target value indices 304 indicating the operation target values are indices corresponding to the operation target values set in the setting screen illustrated in FIG. 2. Although, in this case, all of the operation target value indices 304 are displayed in the same display mode, it is also acceptable to display the index corresponding to the operation target value closest to the current focus operation command value in a different display mode from other indices. Differentiated display modes of indices may include at least one of the presence or absence of blink, gradation, color, size, and shape. An operation command value index 305 indicates the focus operation command value. According to the present exemplary embodiment, the operation command value index 305 is constantly displayed in the enlarged display area 303.

FIG. 3B illustrates an example of a display screen when an operation target value index 304 is displayed in the enlarged display area 303 because of a small difference between the focus operation command value and the operation target value. In this case, the difference between the operation command value index 305 and the operation target value index 304 is enlarged and displayed in the enlarged display area 303, and therefore the visibility of the difference is improved. Therefore, this case may be advantageous in improving accuracy in operating the focus lens 204 to reach the operation target value. FIGS. 3A and 3B merely illustrate examples, and the display mode is not limited thereto. For example, the numeric display area 301 may display the difference between the operation command value and all of the operation target values.

Figure 4:
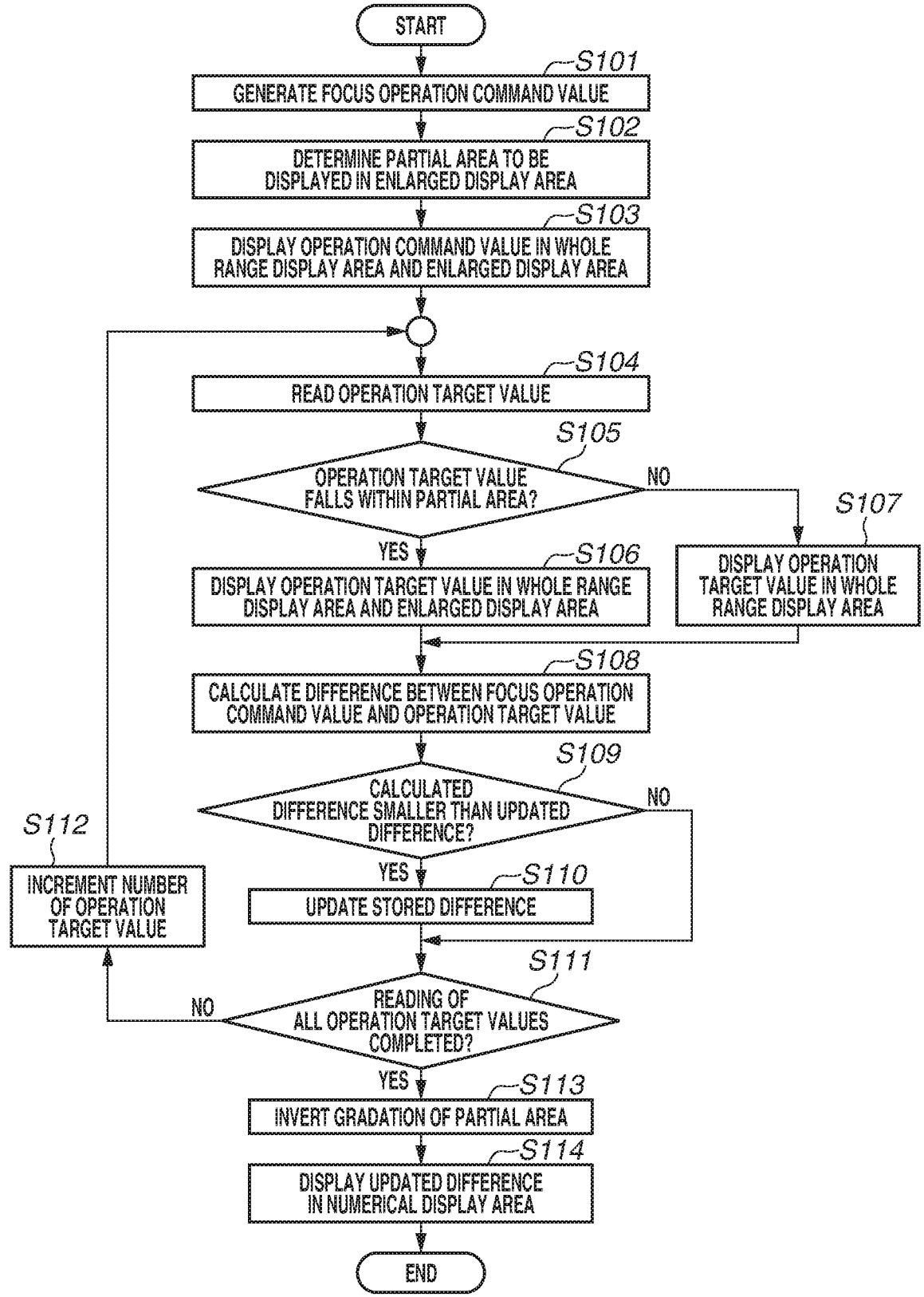
FIG. 4 is a flowchart illustrating an example of processing in the operation apparatus.

FIG. 4 is a flowchart illustrating an example of processing in the operation apparatus. The following descriptions will be limited to a case where one or more operation target values are stored (set) in the storage unit 106. Naturally, this processing can be easily modified to apply also to a case where no operation target value is stored in the storage unit 106. In step S101, the command value generation unit 103 generates a focus operation command value. In step S102, the command value generation unit 103 determines a partial area to be displayed in the enlarged display area 303 based on the focus operation command value generated in step S101. In step S103, the command value generation unit 103 displays the focus operation command value generated in step S101 together with the entire area in the whole range display area 302 and together with the partial area determined in step S102 in the enlarged display area 303.

In step S104, the command value generation unit 103 reads an operation target value from the storage unit 106. In step S105, the command value generation unit 103 determines whether the operation target value read in step S104 falls within the partial area determined in step S102. When the operation target value falls within the partial area (YES in step S105), the processing proceeds to step S106. On the other hand, when the operation target value does not fall within the partial area (NO in step S105), the processing proceeds to step S107. In step S106, the command value generation unit 103 displays the operation target value read in step S104 in the whole range display area 302 and the enlarged display area 303. In step S107, the command value generation unit 103 displays the operation target value read in step S104 only in the whole range display area 302.

In step S108, the command value generation unit 103 calculates the difference between the focus operation command value generated in step S101 and the operation target value read in step S104. In step S109, the command value generation unit 103 determines whether the difference calculated in step S108 is smaller than the updated difference. When the calculated difference is smaller than the updated difference (YES in step S109), the processing proceeds to step S110. On the other hand, when the calculated difference is not smaller than the updated difference (NO in step S109), the processing proceeds to step S111. However, if the updated difference is not stored, the processing proceeds to step S110. In step S110, the command value generation unit 103 updates the stored difference with the difference calculated in step S108 (if the difference is not stored, the command value generation unit 103 stores the difference calculated in step S108). In step S111, the command value generation unit 103 determines whether the reading of all of the operation target values stored in the storage unit 106 is completed. When the reading is not completed (NO in step S111), the processing proceeds to step S112. On the other hand, when the reading is completed (YES in step S111), the processing proceeds to step S113.

In step S112, the command value generation unit 103 increments the number of the operation target value to be read. In step S113, the command value generation unit 103 inverts the gradation of the partial area determined in step S102 in the whole range display area 302 and also inverts the entire gradation of the enlarged display area 303. In step S114, the command value generation unit 103 displays the updated difference in the numeric display area 301. As a result, the minimum difference between the current focus operation command value and each operation target value is displayed. When the above-described processing is completed, the difference is initialized (not carried over to the following processing).

As described above, the display unit 107 is configured to, when the operation target value and the operation command value (operation amount) fall within a predetermined partial area of the entire area, enlarge and display the partial area. The display unit 107 is configured to display the operation command value and operation target value in the enlarge-displayed partial area. Thus, when performing an operation in the vicinity of an operation target value, the operation apparatus according to the present exemplary embodiment allows the user to perform the operation while visibility of the difference between the operation target value and the operation command value is improved. Therefore, for example, an operation apparatus can be provided, which advantageously operates the optical element in the vicinity of an operation target value.

A second exemplary embodiment will be described below with reference to FIGS. 5 to 7. Configurations of the lens apparatus and operation apparatus according to the second exemplary embodiment are similar to those according to the first exemplary embodiment (FIG. 1). FIG. 5 illustrates an example of a setting screen according to the second exemplary embodiment. This setting screen is displayed by the display unit 107 to allow the setting unit 105 to make a setting. Referring to FIG. 5, Memory1 and Memory2 are equivalent to those in FIG. 2. "Enlarged Area" is a setting value related to the width (predetermined range) of the focus operation command value (operation amount) to be enlarged and displayed in the enlarged display area 303. The display unit 107 enlarge-displays in the enlarged display area 303 the partial area having the width (range to be enlarged) set with "Enlarged Area" centering on the focus operation command value. "Match Area" is a setting value indicating a tolerance smaller than the above-described predetermined range (Enlarged Area) to deem the focus operation command value and an operation target value as matched with each other. When the difference between the focus operation command value and the operation target value falls within the tolerance set with "Match Area", the display unit 107 presents display indicating that the operation command value and the operation target value are matched (matched display).

Although an enlargement range and the tolerance can be changed by making a setting, these ranges may also be predetermined fixed ranges. The ranges may also be suitably set based on the size of the display device configuring the display unit 107. The ranges may also be changed according to the imaging conditions of the lens apparatus 20. In addition, either the enlargement range or the tolerance may be set, and another may be changed in association with the setting.

Figure 6A:
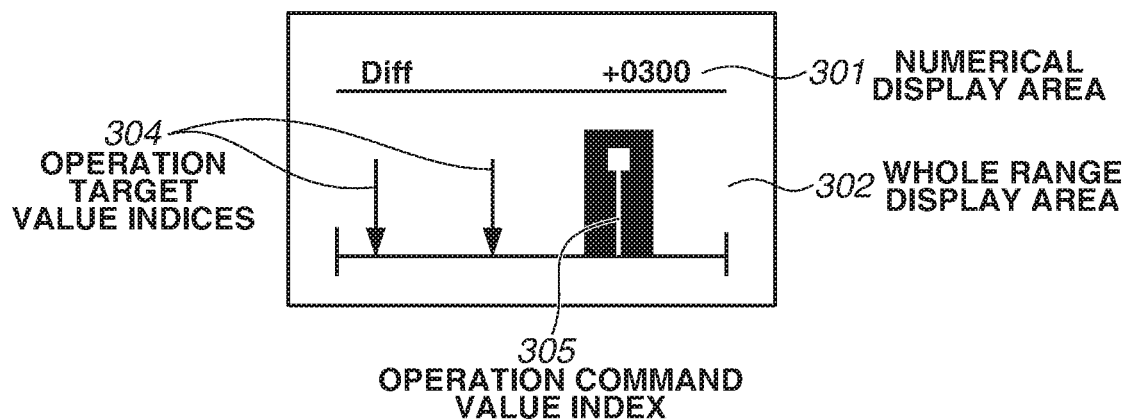
FIGS. 6A, 6B, and 6C illustrate examples of display screens.
Figure 6B:
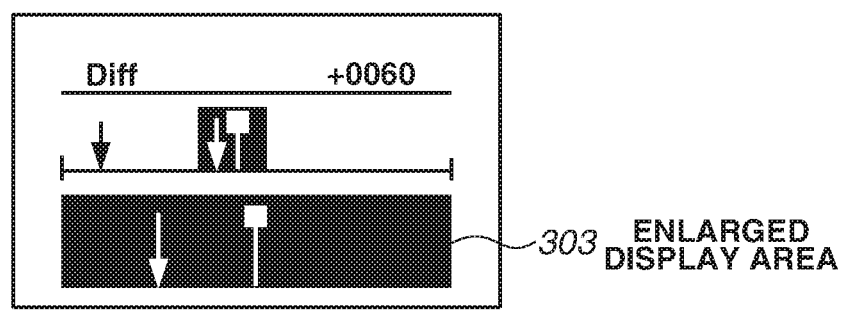
Figure 6C:
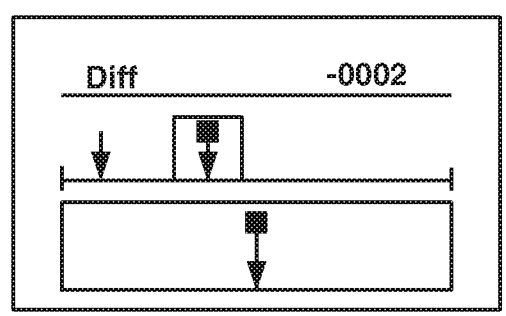

FIGS. 6A, 6B, and 6C illustrate examples of display screens displayed in the display unit 107. These display screens are displayed when the user is operating the operation member 101. According to the second exemplary embodiment, the display state of the display unit 107 is switched between a whole range display state, an enlarged display state, and a matched display state based on the difference between the current focus operation command value and an operation target value.

FIG. 6A illustrates an example of the whole range display state. The whole range display state is used in a case where the difference between the current focus operation command value and an operation target value does not fall within a predetermined range (where the current focus operation command value and the operation target value do not fall within a predetermined partial area). When a plurality of operation target values is stored, the difference refers to the minimum difference for these operation target values. In the whole range display state, the current focus operation command value is far from the operation target values. Therefore, in this display state, the enlarged display is not required since the operation target values do not appear in the enlarged display area 303 (FIG. 6B) during the enlarged display. Therefore, to improve the visibility of the whole range display area 302, the enlarged display area 303 is not displayed and only the whole range display area 302 is largely displayed. The whole range display area 302 displays the current focus operation command value and the operation target value together with the difference between the two values, in the entire area having an upper limit and a lower limit which the focus operation command value can take. The area to be enlarge-displayed in the enlarged display area 303 in the enlarged display state (described below) is displayed with the inverted gradation.

FIG. 6B illustrates an example of the enlarged display state. The enlarged display state is used in a case where the difference between the current focus operation command value and the operation target value falls within a predetermined range and does not fall within a tolerance smaller than the predetermined range. In the enlarged display state, at least one operation target value index 304 appears in the enlarged display area 303 since the current focus operation command value is close to the operation target value. In the present case, the whole range display area 302 and the enlarged display area 303 are displayed at the same time. The enlarged display area 303 according to the present exemplary embodiment displays the predetermined range (partial area) centering on the current focus operation command value. Therefore, the difference between the current focus operation command value and the operation target value is relatively expressed on the basis of the above-described predetermined range (partial area). Accordingly, when the focus operation command value exists in the vicinity of each operation target value, the visibility of the index and hence the operability of the operation member 101 (optical element) can be improved. Although, in the example illustrated in FIG. 6B, the enlarged display is performed centering on the current focus operation command value, the enlarged display may be performed centering on an operation target value. In this case, the enlarged display area 303 displays the predetermined range (partial area) centering on the operation target value.

FIG. 6C illustrates an example of a matched display state. The matched display state is used in a case where the difference between the current focus operation command value and the operation target value falls within the above-described predetermined range and falls within a tolerance smaller than the predetermined range. The matched display state indicates that the current focus operation command value and the operation target value are matched (fall within the tolerance) by canceling the inversion of gradation performed in the enlarged display area 303. This allows the user to easily confirm that an operation (reproduction operation) on the operation target value is completed. The matched display state may not be necessarily provided. The display s illustrated in FIGS. 6A, 6B, and 6C are, naturally, not limited thereto and may be other various modes.

Figure 7:
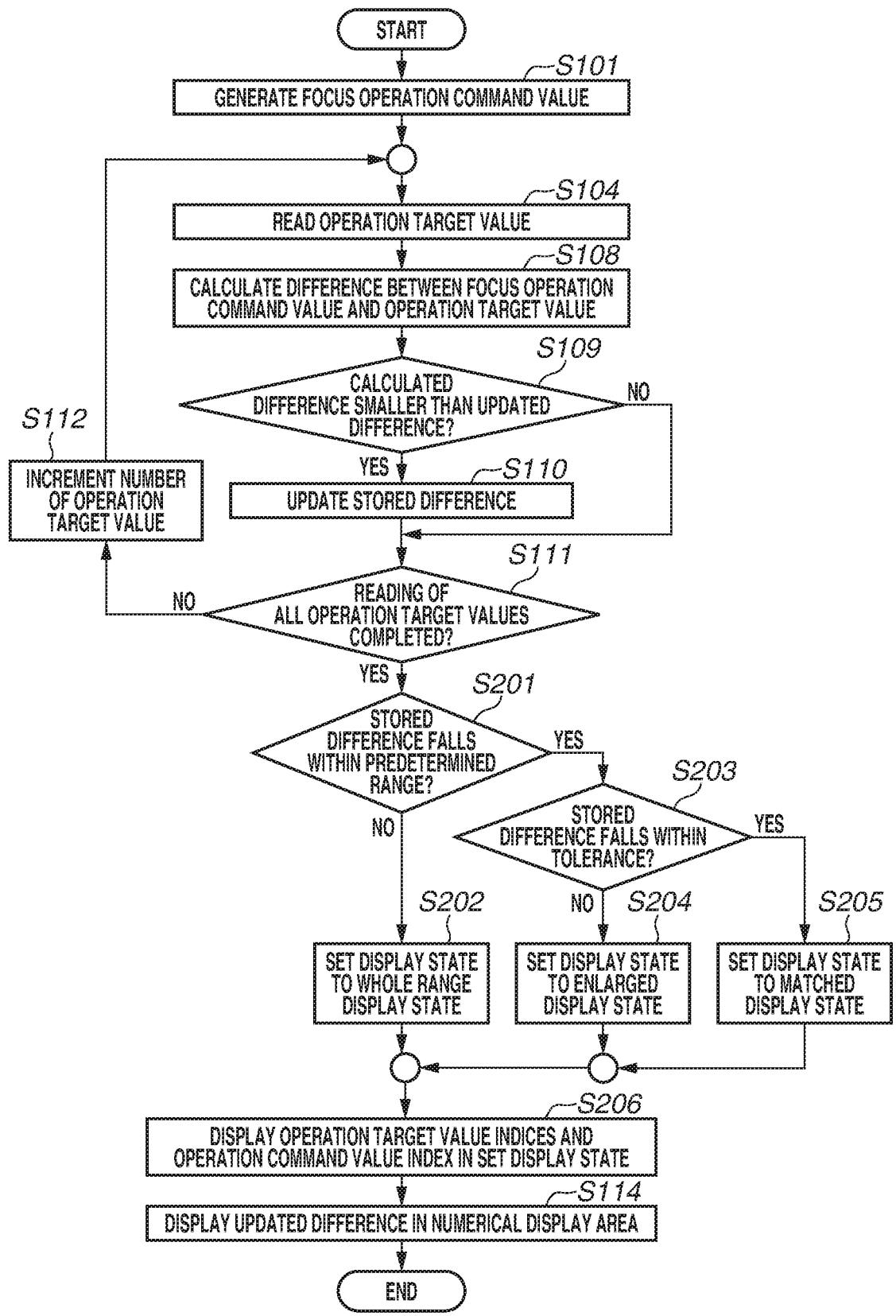
FIG. 7 is a flowchart illustrating an example of processing in the operation apparatus.

FIG. 7 is a flowchart illustrating an example of processing in the operation apparatus. The following descriptions will be limited to a case where one or more operation target values are stored (set) in the storage unit 106. Naturally, this processing can be easily modified to apply also to a case where no operation target value exists. Descriptions of processing equivalent to the processing illustrated in FIG. 4 (first exemplary embodiment) will be omitted. Processing in steps S101 and S104 is similar to the processing according to the first exemplary embodiment. According to the second exemplary embodiment, the display state is not determined at this timing, so that processing in steps S102, S103, and S105 to S107 is not performed. Processing in steps S108 to S112 is similar to the processing according to the first exemplary embodiment.

In step S201, the command value generation unit 103 determines whether the stored difference falls within the predetermined range. When the difference does not fall within the predetermined range (NO in step S201), the processing proceeds to step S202. On the other hand, when the difference falls within the predetermined range (YES in step S201), the processing proceeds to step S203. In step S202, the command value generation unit 103 sets the display to the whole range display state. In this state, the display unit 107 performs display in the display form illustrated in FIG. 6A. In step S203, the command value generation unit 103 determines whether the stored difference falls within the tolerance. When the stored difference does not fall within the tolerance (NO in step S203), the processing proceeds to step S204. On the other hand, when the stored difference falls within the tolerance (YES in step S203), the processing proceeds to step S205. In step S204, the command value generation unit 103 sets the display to the enlarged display state. In this state, the command value generation unit 103 performs display in the display state illustrated in FIG. 6B. In step S205, the command value generation unit 103 sets the display to the matched display state. In this state, the command value generation unit 103 performs display in the display state illustrated in FIG. 6C. In step S206, the command value generation unit 103 displays the operation target value indices 304 and the operation command value index 305 in the display state set in steps S202, S204, or S205. According to the set display state, the command value generation unit 103 inverts the gradation as required. Processing in step S114 is similar to the processing according to the first exemplary embodiment.

The second exemplary embodiment automatically switches between the whole range display state and the enlarged display state based on the difference between the current focus operation command value and the operation target values. However, this switching may be performed according to a user's operation (instruction). More specifically, for example, the user may select (set) a display state via the setting unit 105. The display state may be changed, for example, when the operation amount detector 102 detects an inversion operation (operation for inverting the operation direction) on the operation member 101 the specific number of times within a specific range of the focus operation command value (in this case, the user is thought to be performing a fine adjustment operation).

As described above, when performing an operation in the vicinity of an operation target value, the operation apparatus according to the present exemplary embodiment allows the user to perform the operation improving the visibility of the difference between the operation target value and the operation command value. Therefore, for example, an operation apparatus can be provided, which advantageously operates the optical element in the vicinity of an operation target value. It is also possible to provide an operation apparatus, which improves the visibility of each display state since the apparatus effectively uses the display area of the display unit 107 by performing the enlarged display as required.

A third exemplary embodiment will be described below with reference to FIG. 8. The third exemplary embodiment changes operation sensitivity according to change of the display state. Examples of configurations of the lens apparatus and operation apparatus according to the present exemplary embodiment may be similar to those according to the first exemplary embodiment illustrated in FIG. 1. According to the present exemplary embodiment, the command value generation unit 103 refers to the display state of the display unit 107. The display state of the display unit 107 may be similar to that according to the second exemplary embodiment. The setting contents of the setting unit 105 according to the present exemplary embodiment may be similar to those according to the second exemplary embodiment illustrated in FIG. 5. The display screens of the display unit 107 according to the present exemplary embodiment may be similar to those according to the second exemplary embodiment illustrated in FIGS. 6A, 6B, and 6C. The processing flow of the operation apparatus 10 may be similar to that according to the second exemplary embodiment illustrated in FIG. 7.

Figure 8:
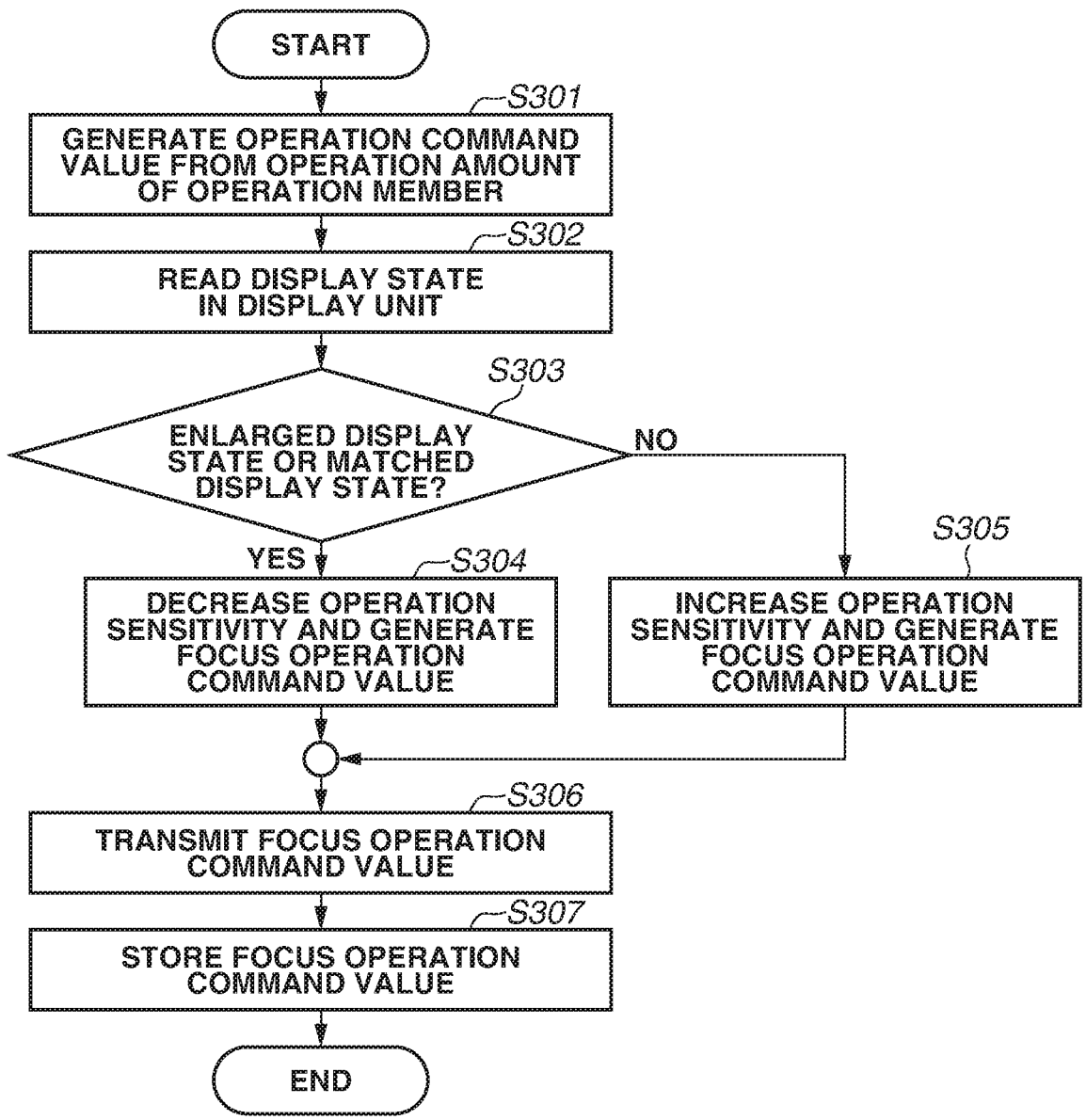
FIG. 8 is a flowchart illustrating an example of processing for acquiring an operation command value according to a third exemplary embodiment.

FIG. 8 is a flowchart illustrating an example of processing for acquiring the operation command value according to the third exemplary embodiment. In step S301, the command value generation unit 103 generates an operation command value based on an output signal (operation amount of the operation member 101) of the operation amount detector 102. In step S302, the command value generation unit 103 reads the display state on the display unit 107. The display state read in this case is the display state according to the second exemplary embodiment, i.e., one of the whole range display state, the enlarged display state, and the matched display state. The display state is assumed to be prestored in the storage unit 106. In step S303, the command value generation unit 103 determines whether the display state read in step S302 is the enlarged display state or matched display state. When the read display state is the enlarged display state or matched display state (YES in step S303), the processing proceeds to step S304. On the other hand, when the read display state is the whole range display state (NO in step S303), the processing proceeds to step S305.

In step S304, the command value generation unit 103 sets a lower operation sensitivity than the operation sensitivity in step S305 (described below) to generate a focus operation command value. The operation sensitivity indicates the ratio of the variation of the focus operation command value to the operation amount of the operation unit 101. Therefore, the command value generation unit 103 sets a smaller ratio of the variation of the focus operation command value to the operation amount of the operation unit 101 than the ratio in step S305 to generate a focus operation command value. In step S305, the command value generation unit 103 sets a higher operation sensitivity than the operation sensitivity in step S304 to generate a focus operation command value. More specifically, the command value generation unit 103 sets a larger ratio of the variation of the focus operation command value to the operation amount of the operation unit 101 than the ratio in step S304 to generate a focus operation command value. The operation sensitivities set in steps S304 and S305 may be predetermined fixed values or values arbitrarily set by the user. The operation sensitivities may also be changed based on a state or an imaging condition (for example, depth of field) of the lens apparatus 20. The operation sensitivities may also be changed based on the difference displayed in the numeric display area 301 of the display unit 107.

In step S306, the command value generation unit 103 transmits the generated focus operation command value to the demand communication unit 104 and the display unit 107. The demand communication unit 104 transmits the received focus operation command value to the lens apparatus 20 according to a specific communication protocol. In step S307, the command value generation unit 103 stores the focus operation command value in the memory. The stored focus operation command value is used to generate the next focus operation command value. Although, in the above-described processing flow, the operation sensitivity is changed based on the display state of the display unit 107, a unit for changing the operation sensitivity may be separately provided and the display state of the display unit 107 may be changed based on the state of the operation sensitivity.

As described above, when performing an operation in the vicinity of an operation target value, the operation apparatus according to the present exemplary embodiment allows the user to perform the operation, improving the visibility of the difference between the operation target value and the operation command value. Therefore, for example, an operation apparatus can be provided, which advantageously operates the optical element in the vicinity of an operation target value. It is also possible to provide an operation apparatus, which is more advantageous in operability (fine adjustment) of the optical element in the vicinity of an operation target value by changing (decreasing) the operation sensitivity according to the enlarged display. For example, in comparison with the first and the second exemplary embodiments, it is possible to decrease the difference in the ratio of the moving amount of the operation command value index to the operation amount of the operation member 101 between the whole range display state and the enlarged display state, thus making the operation apparatus more advantageous in operability of the optical element.

Figure 9:
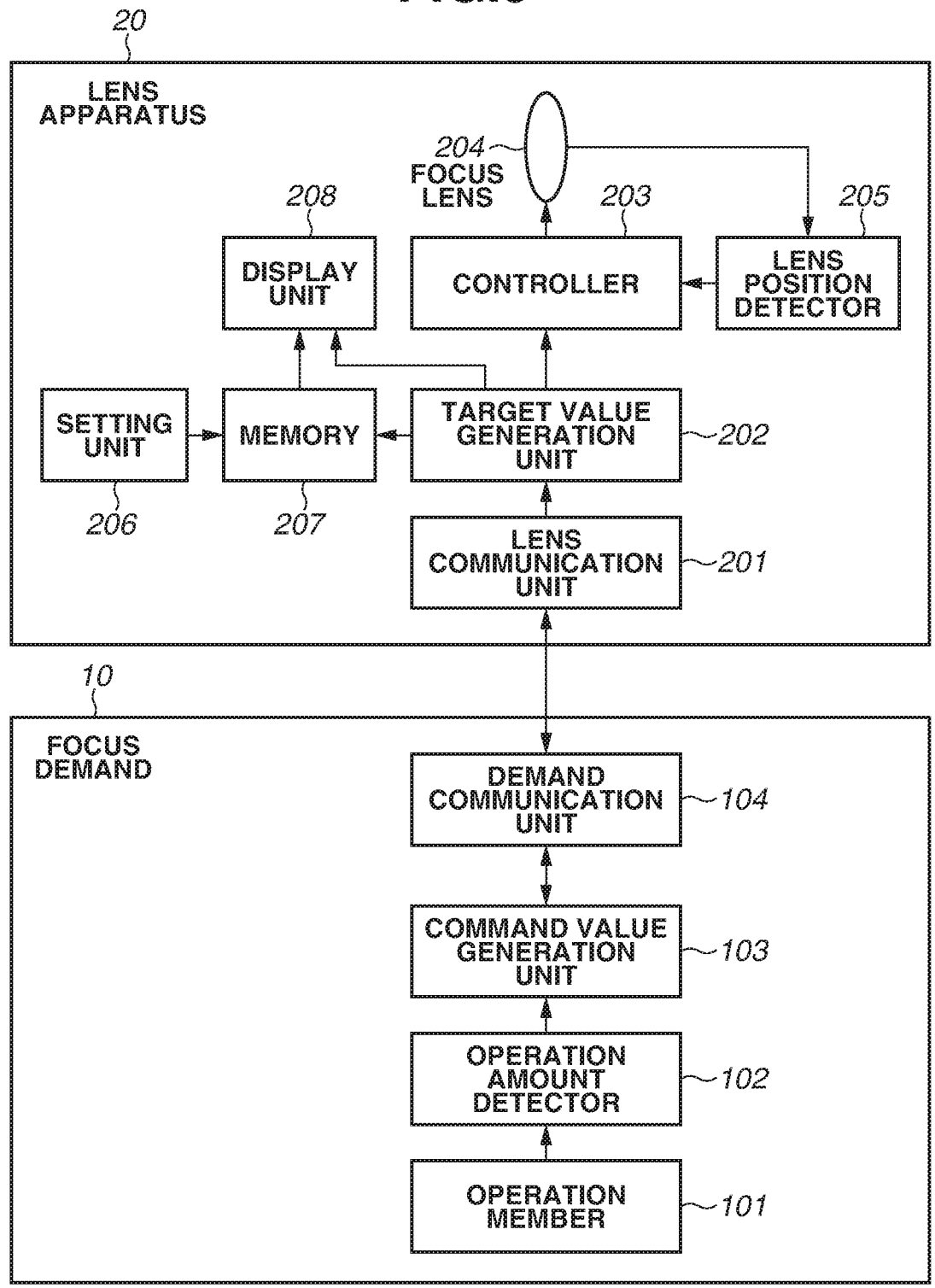
FIG. 9 illustrates examples of configurations of a lens apparatus and an operation apparatus according to a fourth exemplary embodiment.

A fourth exemplary embodiment will be described below with reference to FIG. 9. The first to the third exemplary embodiment perform processing for displaying the operation command value index 305 and the operation target value indices 304 within the focus demand 10 (operation apparatus). The fourth exemplary embodiment performs this processing within the lens apparatus 20. FIG. 9 illustrates examples of configurations of the lens apparatus and operation apparatus according to the fourth exemplary embodiment. According to the present exemplary embodiment, the lens apparatus 20 includes the setting unit 206, the storage unit 207, and the display unit 208. The setting unit 206 is equivalent to the setting unit 105, the storage unit 207 is equivalent to the storage unit 106, and the display unit 208 is equivalent to the display unit 107. The display unit 208 displays the operation target values and the control target value (control target position) generated by the target value generation unit 202. The target value generation unit 202 also functions as a main controller. The lens apparatus 20 according to the present exemplary embodiment performs similar processing to that of the focus demand 10 (operation apparatus) according to one of the first to the third exemplary embodiments and displays a similar display screen to that according to one of the first to the third exemplary embodiments on the display unit 208. The target value generation unit 202 may change the operation sensitivity of the operation member 101 through similar processing to that of the command value generation unit 103 in the focus demand 10 according to the third exemplary embodiment. The lens apparatus 20 may be able to singly operate the focus lens 204 while the lens apparatus 20 includes the function of the focus demand 10 (operation apparatus) according to one of the first to the third exemplary embodiments.

As described above, when operating the operation member 101 in the vicinity of an operation target value, the lens apparatus 20 according to the present exemplary embodiment allows the user to perform an operation with the improved visibility of the difference between the operation target value and the control target value or the operation command value. Therefore, for example, it is possible to provide a lens apparatus, which advantageously operates the optical element in the vicinity of an operation target value.

Figure 10:
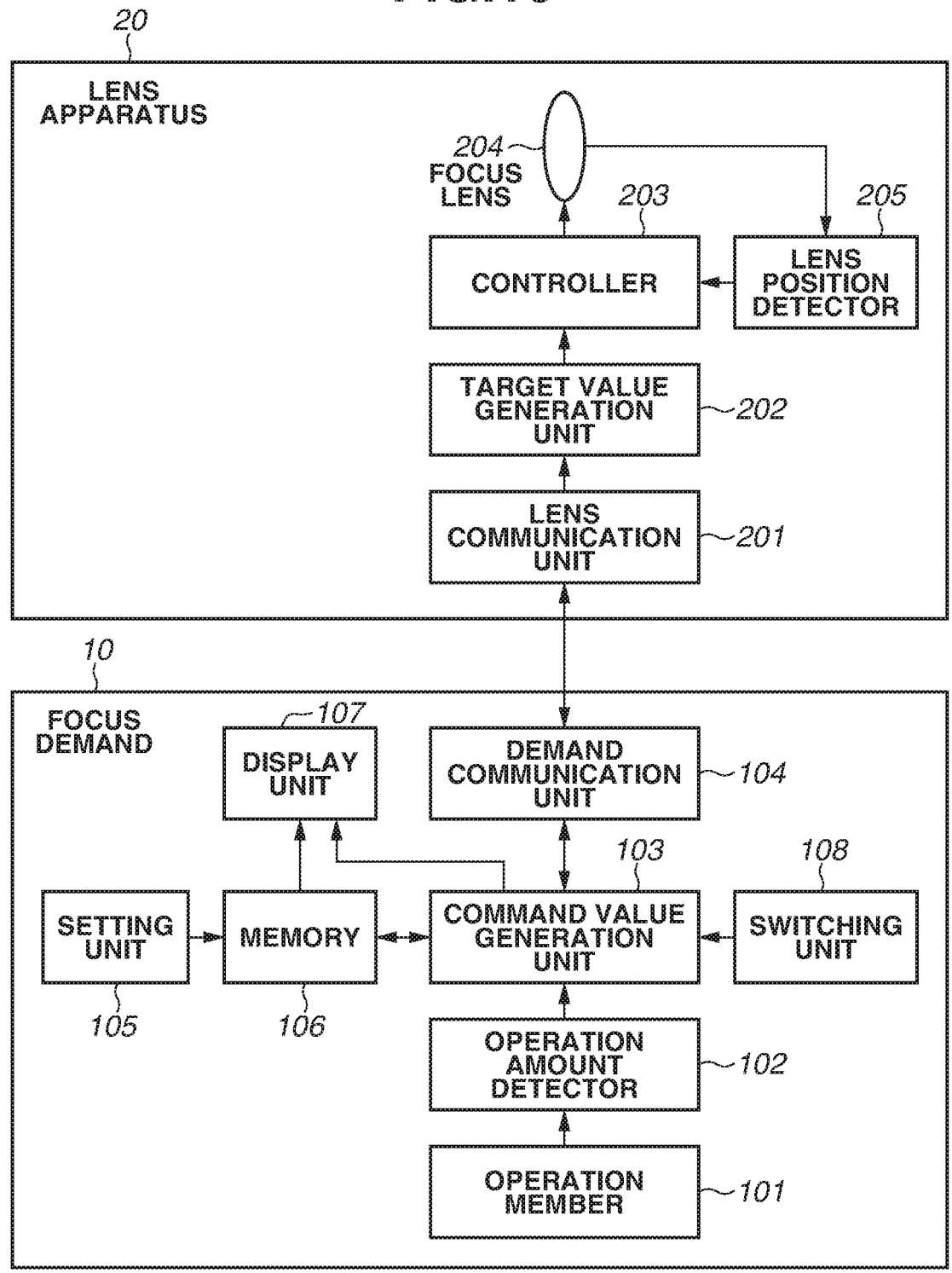
FIG. 10 illustrates examples of configurations of a lens apparatus and an operation apparatus according to a fifth exemplary embodiment.

FIG. 10 illustrates configurations of the lens apparatus and operation apparatus according to the fifth exemplary embodiment. The command value generation unit 103 generates a focus operation command value based on the operation amount of the operation member 101 detected by the operation amount detector 102, the operation target values stored in the storage unit 106, and the output from the switching unit 108 (described below). The switching unit (switch) 108, which may be a toggle switch for example, is used to enable or disable the fine adjustment mode (for performing the fine adjustment on the operation command value) for generating a focus operation command value based on the operation target values. The fine adjustment mode is a mode for setting a small ratio (operation sensitivity) of the variation of the focus operation command value to the variation of the operation amount of the operation member 101 in a case where the focus operation command value is present in the vicinity of an operation target value. The fine adjustment mode set by the switching unit 108 is referenced by the command value generation unit 103. FIG. 11 illustrates an example of a setting screen displayed by the display unit 107. This setting screen is similar to the setting screen (FIG. 2) according to the first exemplary embodiment except for the displayed numerical values, therefore, a detailed description thereof will be omitted.

Figure 12A:
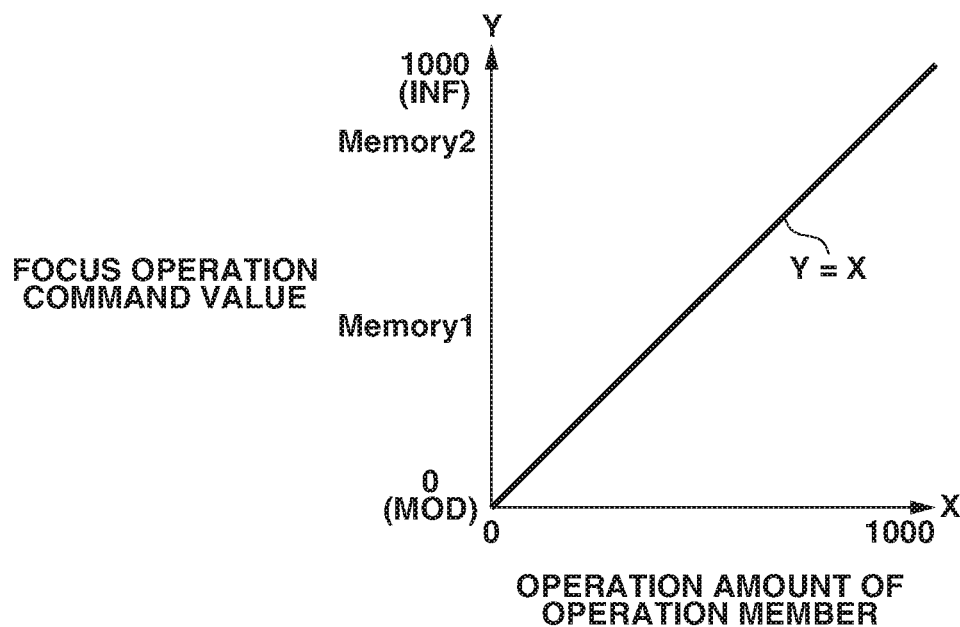
FIGS. 12A and 12B illustrate methods for generating an operation command value.
Figure 12B:
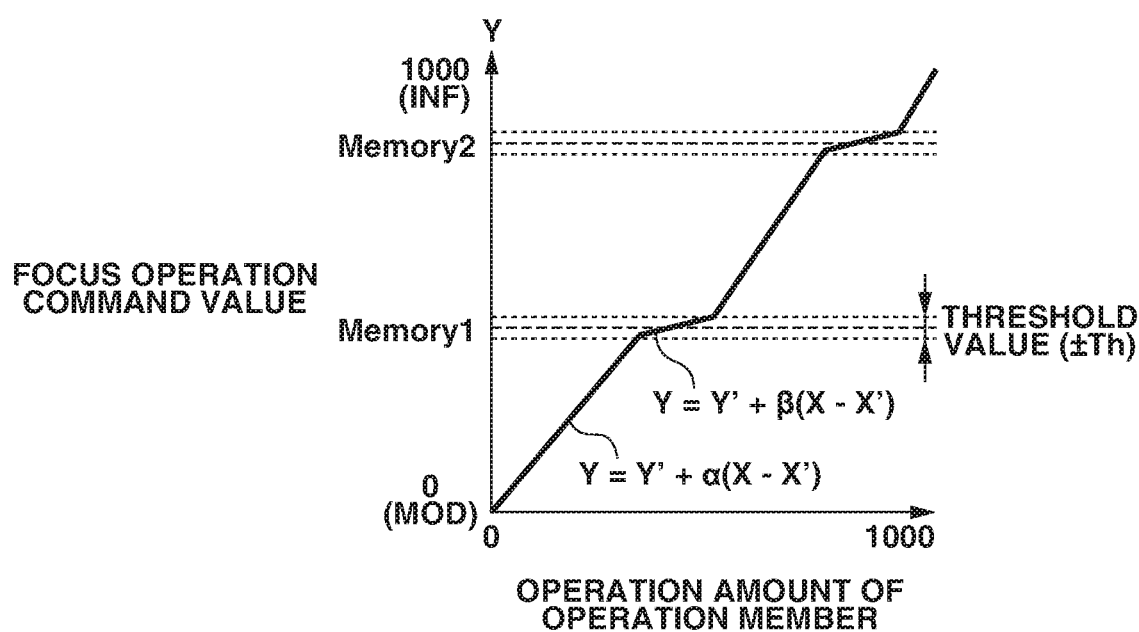

FIGS. 12A and 12B illustrate a method for generating an operation command value according to the present exemplary embodiment. FIG. 12A illustrates a method for generating a focus operation command value when the fine adjustment mode is disabled. FIG. 12B illustrates a method for generating a focus operation command value when the fine adjustment mode is enabled. Referring to FIGS. 12A and 12B, the horizontal axis X indicates the operation amount (operation position) of the operation member 101 detected by the operation amount detector 102. According to the present exemplary embodiment, the horizontal axis X is assigned a value normalized with a minimum rotation angle of zero and a maximum rotation angle of 1000 because of mechanical limitations of the rotatable range of the operation member 101. Memory1 and Memory2 illustrated in FIGS. 12A and 12B indicate operation target values.

The vertical axis Y indicates the focus operation command value to be transmitted to the lens apparatus 20, which is a value normalized with a lower limit (closest point) of zero and an upper limit (infinite point) of 1000. Referring to FIG. 12B, X' indicates the operation amount of the operation member 101 at a latest time that the operation command value is generated, and Y' indicates the focus operation command value generated at a latest time.

When the fine adjustment mode is disabled, the command value generation unit 103 generates a focus operation command value not based on operation target values, as illustrated in FIG. 12A. In this case, the focus operation command value is calculated by the following Formula 1.

$$Y=X \qquad \text{(Formula 1)}$$

When the fine adjustment mode is enabled, the command value generation unit 103 generates a focus operation command value based on operation target values, as illustrated in FIG. 12B. Referring to FIG. 12B, when the difference between the operation target value and the latest focus operation command value (Y') does not fall within a predetermined range, the focus operation command value is calculated by the following Formula 2.

$$Y=Y'+\alpha(X-X') \qquad \text{(Formula 2)}$$

On the other hand, when the difference between the operation target value and the latest focus operation command value (Y') falls within the predetermined range, the focus operation command value is calculated by the following Formula 3.

$$Y=Y'+\beta(X-X') \qquad \text{(Formula 3)}$$

A larger value of the operation sensitivities α and β in the Formulas 2 and 3 means a higher operation sensitivity, and a smaller value of the operation sensitivities α and β means lower operation sensitivity. According to the present exemplary embodiment, assuming that the operation sensitivity β and the width 2Th of the predetermined range are fixed values, the operation sensitivity α is calculated by the following Formula 4 where a relation α>1>β is satisfied. The values of the denominator and numerator in the following Formula 4 are positive values (non-zero values).

$$\alpha = (1000 - (2Th * \text{Number of stored values})) / (1000 - ((2Th * \text{Number of stored values}) / \beta)) \quad \text{(Formula 4)}$$

"Number of stored values" in the Formula 4 indicates the number of operation target values stored in the storage unit 106. For example, when the operation sensitivity β is ⅓, the width 2Th is 100 (Th=50), and the number of stored values is 2, the operation sensitivity α will be calculated as 2. This means that the operation sensitivity normally decreases three times from the normal case (FIG. 12A) within a 5% area (=50, respectively) around the vicinity of operation target values and that the operation sensitivity increases twice from the normal case in other areas. The portion (2Th×Number of stored values) in the Formula 4 needs to be modified if the difference between the operation target values is smaller than a threshold value Th or if the difference between the operation target value and the lower or upper limit of the focus operation command value is smaller than the threshold value Th. Strictly speaking, formulas which takes such cases into consideration are required. In the present case, however, the above-described cases are excluded to simplify descriptions.

Figure 13:
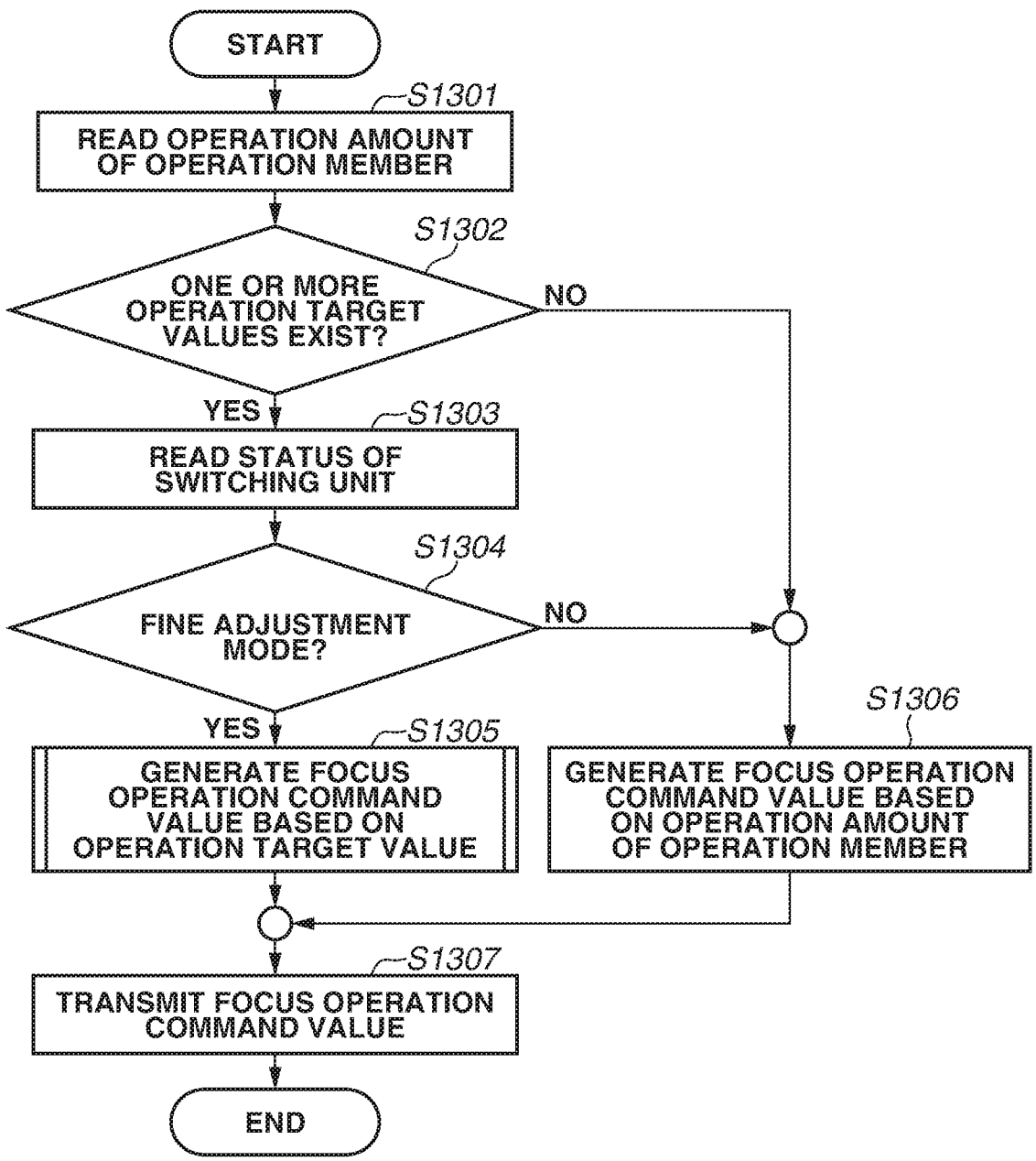
FIG. 13 is a flowchart illustrating an example of processing for generating an operation command value.

FIG. 13 is a flowchart illustrating an example of processing for generating an operation command value according to the present exemplary embodiment. In step S1301, the command value generation unit 103 reads the output (the operation amount of the operation member 101) of the operation amount detector 102. In step S1302, the command value generation unit 103 determines whether one or more operation target values are stored in the storage unit 106. When one or more operation target values are stored (YES in step S1302), the processing proceeds to step S1303. On the other hand, when no operation target value is stored (NO in step S1302), the processing proceeds to step S1306. In step S1303, the command value generation unit 103 reads the status of the switching unit 108 (whether the fine adjustment mode is enabled). In step S1304, the command value generation unit 103 determines whether the fine adjustment mode is enabled. When the fine adjustment mode is enabled (YES in step S1304), the processing proceeds to step S1305. On the other hand, when the fine adjustment mode is disabled (NO in step S1304), the processing proceeds to step S1306.

In step S1305, the command value generation unit 103 generates a focus operation command value based on the operation target values stored in the storage unit 106. This processing conforms to the method for generating a focus operation command value illustrated in FIG. 12B. This processing will be described in detail below with reference to FIG. 14. In step S1306, the command value generation unit 103 generates a focus operation command value based on the operation amount of the operation member 101 read in step S1301. This processing conforms to the method for generating a focus operation command value illustrated in FIG. 12A. This processing generates a focus operation command value by using the above-described Formula 1. In step S1307, the command value generation unit 103 instructs the demand communication unit 104 to transmit the generated focus operation command value to the lens apparatus 20.

Figure 14:
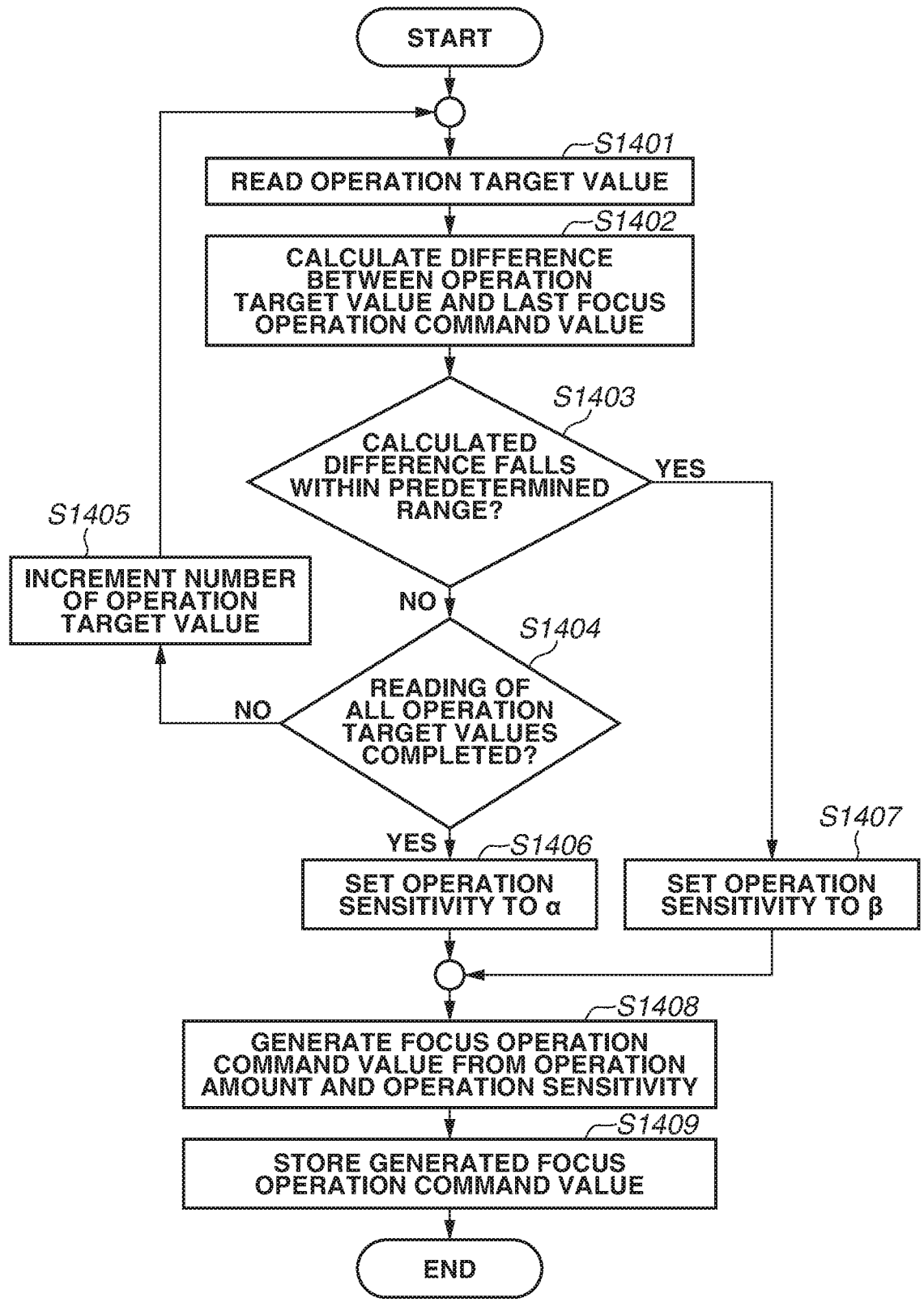
FIG. 14 is an example flowchart illustrating a part (S1305) of the processing for generating an operation command value.

FIG. 14 is a flowchart illustrating an example of processing of a part (step S1305 illustrated in FIG. 13) of the processing for generating an operation command value. This processing is performed when the fine adjustment mode is enabled. In step S1401, the command value generation unit 103 reads an operation target value stored in the storage unit 106. In step S1402, the command value generation unit 103 calculates the difference between the operation target value read in step S1401 and the latest focus operation command value that is stored. In step S1403, the command value generation unit 103 determines whether the difference calculated in step S1402 falls within a predetermined range (within a width 2Th). When the difference does not fall within the predetermined range (NO in step S1403), the processing proceeds to step S1404. On the other hand, when the difference falls within the predetermined range (YES in step S1403), the processing proceeds to step S1407. In step S1404, the command value generation unit 103 determines whether the reading of all of the operation target values stored in the storage unit 106 is completed. When the reading is not completed (NO in step S1404), the processing proceeds to step S1405. On the other hand, when the reading is completed (YES in step S1404), the processing proceeds to step S1406. In step S1405, the command value generation unit 103 increments the number of the operation target value.

In step S1406, the command value generation unit 103 sets the operation sensitivity to a. In this case, since the difference between the operation target value and the latest focus operation command value is large, the operation sensitivity α is set higher than the normal operation sensitivity (in FIG. 12A) so that the focus lens 204 can be quickly operated to the operation target value. In step S1407, the command value generation unit 103 sets the operation sensitivity to β. In this case, since the difference between the operation target value and the latest focus operation command value is small, the operation sensitivity β is set lower than the normal operation sensitivity so that the fine adjustment to the operation target value can be performed in the vicinity of the operation target value. In step S1408, the command value generation unit 103 generates the focus operation command value this time based on the operation amount of the operation member 101 and the set operation sensitivity. The processing is performed by using the above-described Formula 2 or 3. In step S1409, the command value generation unit 103 stores the generated focus operation command value. The stored focus operation command value is used as the latest focus operation command value to generate the next focus operation command value.

As described above, when the fine adjustment mode is enabled, decrease of the operation sensitivity of the focus demand 10 in the vicinity of an operation target value enables easily performing the fine focus adjustment in the vicinity of the operation target value. When the operation command value is far from a stored operation target value, increase of the operation sensitivity of the focus demand 10 enables quickly performing the focus operation in the vicinity of the operation target value. Therefore, the present exemplary embodiment makes it possible, for example, to provide an operation apparatus, which advantageously operates the optical element in the vicinity of an operation target value.

A sixth exemplary embodiment will be described below with reference to FIGS. 15, 16A, 16B, and 16C. According to the sixth exemplary embodiment, the values of the operation sensitivity β and the predetermined range (within the width 2Th) illustrated in FIGS. 12B and 14 can be changed based on information such as a user setting or the depth of field of the lens apparatus 20. Configurations of the lens apparatus and operation apparatus according to the present exemplary embodiment are similar to those according to the fifth exemplary embodiment (FIG. 10). A processing flow for generating a focus operation command value according to the present exemplary embodiment may be similar to the processing flow according to the fifth exemplary embodiment illustrated with reference to FIGS. 13 and 14.

FIG. 15 illustrates an example of a setting screen according to the sixth exemplary embodiment. This screen is displayed when the user is operating the setting unit 105. Referring to FIG. 15, the present exemplary embodiment enables setting the value of the above-described predetermined range (within the width 2Th) as "Fine Area" and enables setting the value of the above-described operation sensitivity β as "Fine Level". This example is configured to select the operation sensitivity β from "Min", "Mid", "Max", and "Auto". When "Auto" is selected, the operation sensitivity β is automatically selected from "Min", "Mid", and "Max" based on information such as the depth of field of the lens apparatus 20. The operation sensitivity β becomes the minimum value when "Min" is selected, becomes the maximum value when "Max" is selected, and becomes an intermediate value when "Mid" is selected. Although, in the examples illustrated in FIGS. 6A, 6B, and 6C, the setting of the operation sensitivity β (Fine Level) is selected, a numerical value may be entered in a way similar to "Fine Area". In the examples illustrated in FIGS. 6A, 6B, and 6C, identical setting values are applied to all of the operation target values. However, for each operation target value, different setting values may be applied to at least one of "Fine Area" and "Fine Level".

Figure 16A:
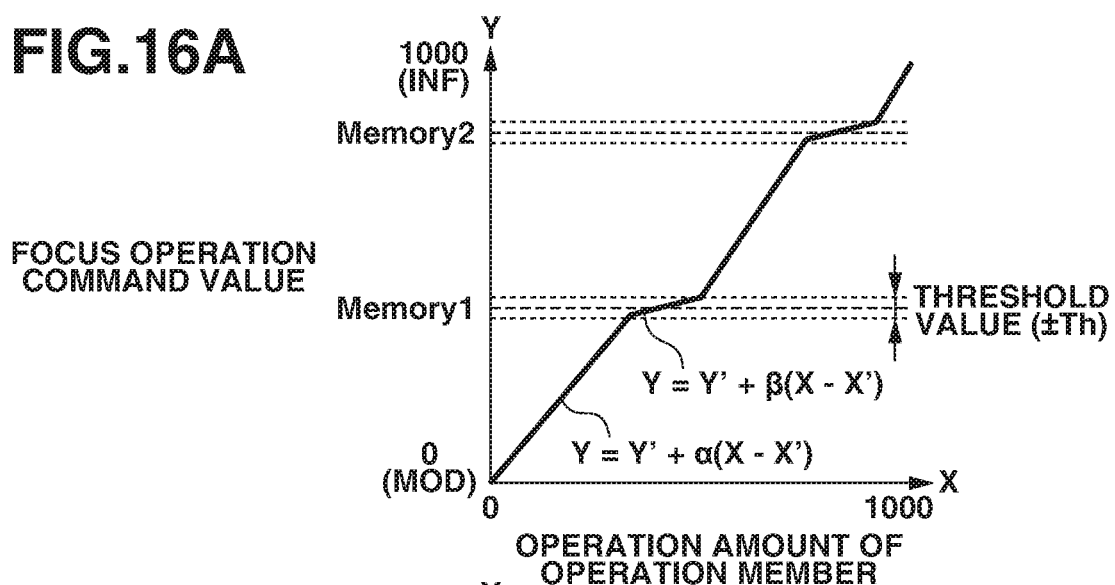
FIGS. 16A, 16B, and 16C illustrate methods for generating an operation command value.
Figure 16B:
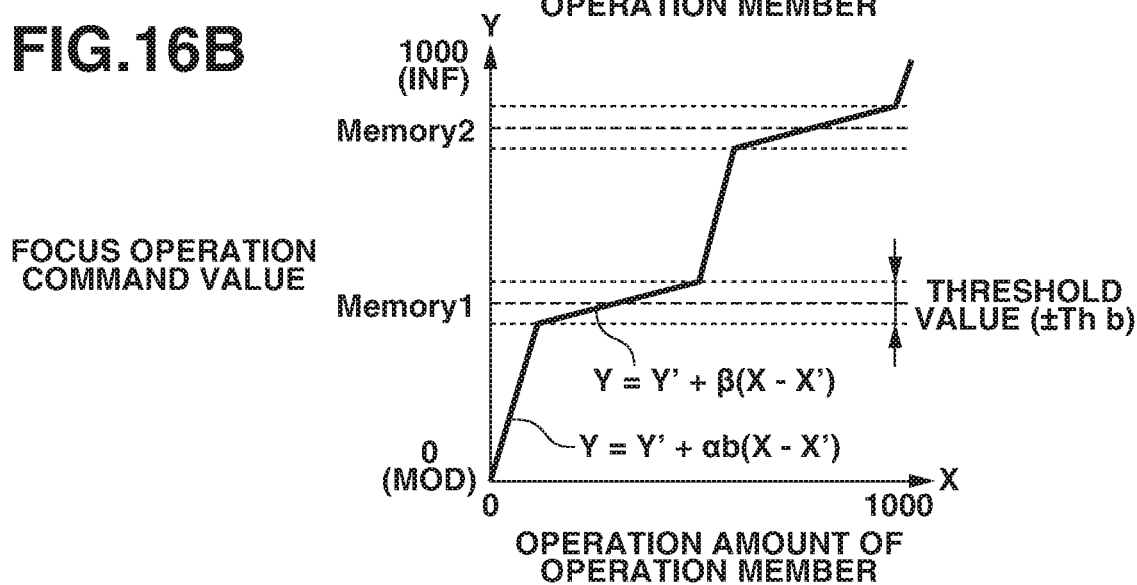
Figure 16C:
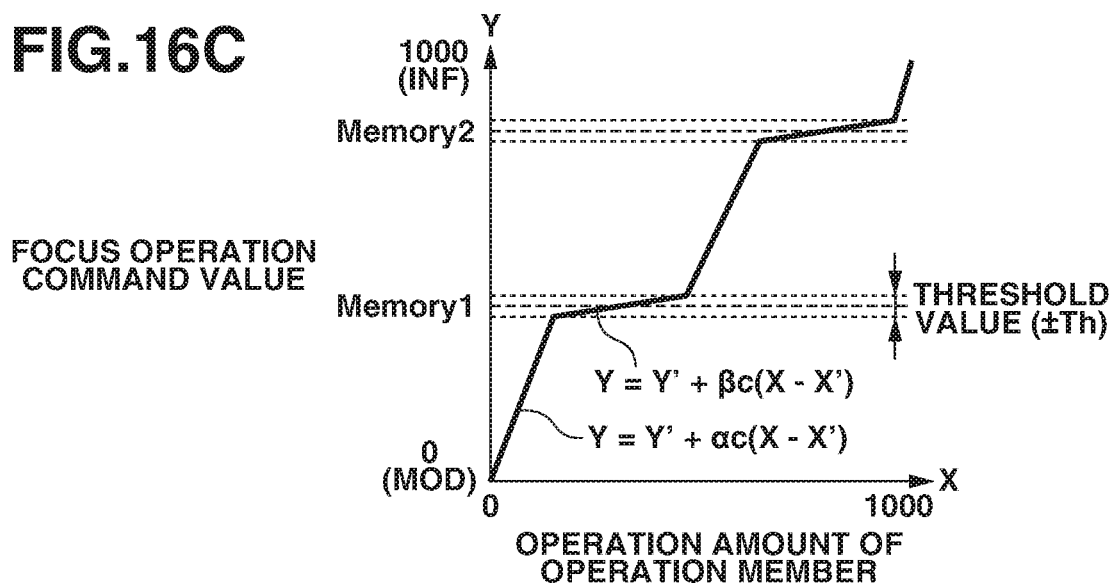

FIGS. 16A, 16B, and 16C illustrate methods for generating a focus operation command value when the fine adjustment mode is enabled according to the present exemplary embodiment. FIG. 16A illustrates a case where the threshold value Th and the operation sensitivity β are set to the same values as those in the fifth exemplary embodiment. FIG. 16B illustrates a case where the threshold value Th is set to Thb (>Th) and the operation sensitivity β is set to β. In this case, according to the fifth exemplary embodiment, the operation sensitivity (Fine Level) in the vicinity of the operation target value is left unchanged, and the range of low operation sensitivity (Fine Area) is widely changed. FIG. 16C illustrates a case where the threshold value Th is set to Th and the operation sensitivity β is set to βc (<β). In this case, according to the fifth exemplary embodiment, the operation sensitivity (Fine Level) in the vicinity of the operation target value is decreased, and the range of the low operation sensitivity (Fine Area) is left unchanged. The operation sensitivity α (αb and αc) illustrated in FIGS. 16B and 16C, respectively, can be calculated and determined by changing the values to be assigned to the threshold value Th and the operation sensitivity β in the Formula 4.

Thus, according to the present exemplary embodiment, for example, an operation apparatus can be provided, which advantageously operates the optical element in the vicinity of an operation target value. The present exemplary embodiment is configured to enable change of the operation sensitivity in the vicinity of the operation target value and the scope of the operation sensitivity. Therefore, the operability of the optical element in the vicinity of the operation target value can be changed according to the subject's state and imaging conditions.

A seventh exemplary embodiment will be described below with reference to FIGS. 17A, 17B, and 18. According to the present exemplary embodiment, a plurality of threshold values Th illustrated in FIGS. 12B and 14 is provided and the operation sensitivity β is gradually changed. Configurations of the lens apparatus and operation apparatus according to the present exemplary embodiment are similar to those according to the fifth exemplary embodiment (FIG. 10). Setting items by the setting unit 105 are similar to those according to the fifth exemplary embodiment illustrated in FIG. 11. The processing flow for generating a focus operation command value according to the present exemplary embodiment is similar to that of the processing flow according to the fifth exemplary embodiment illustrated in FIG. 13.

Figure 17A:
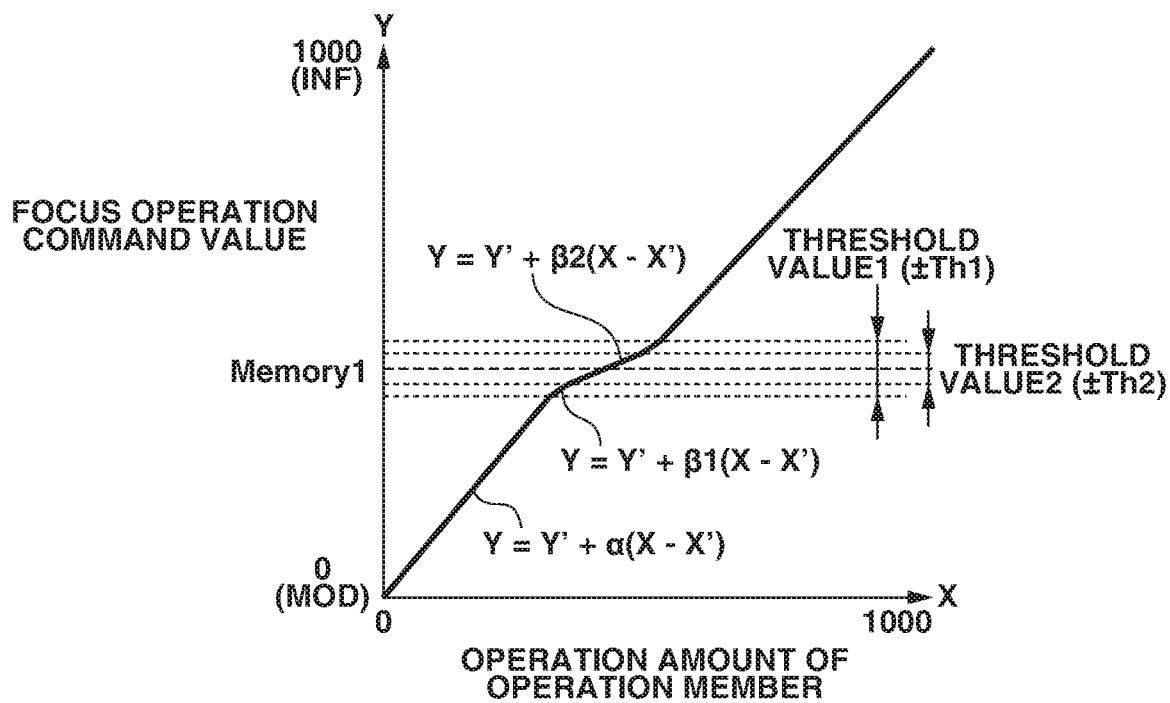
FIGS. 17A and 17B illustrate methods for generating an operation command value according to a seventh exemplary embodiment.

FIG. 17A illustrates a method for generating an operation command value according to the seventh exemplary embodiment when the fine adjustment mode is enabled. Although, in FIG. 17A, only one operation target value is set (stored) to simplify descriptions, a plurality of operation target values may be set as in the fifth or the sixth exemplary embodiment. Referring to FIG. 17A, when the difference between the operation target value and the latest focus operation command value does not fall within a predetermined range (with a width 2Th1), the focus operation command value this time is calculated by the Formula 2 according to the fifth exemplary embodiment. When the difference falls within the predetermined range (within the width 2Th1) and does not fall within a predetermined range (within a width 2Th2 smaller than Th1) inside the above-described range, the focus operation command value this time is calculated by the following Formula 5.

$$Y=Y'+\beta 1(X-X')$$ (Formula 5)

When the difference falls within the predetermined range (within the width 2Th2), the focus operation command value this time is calculated by the following Formula 6.

$$Y=Y'+\beta 2(X-X')$$ (Formula 6)

α, β1, and β2 are set such that an inequality α>β1>β2 is satisfied.

Figure 17B:
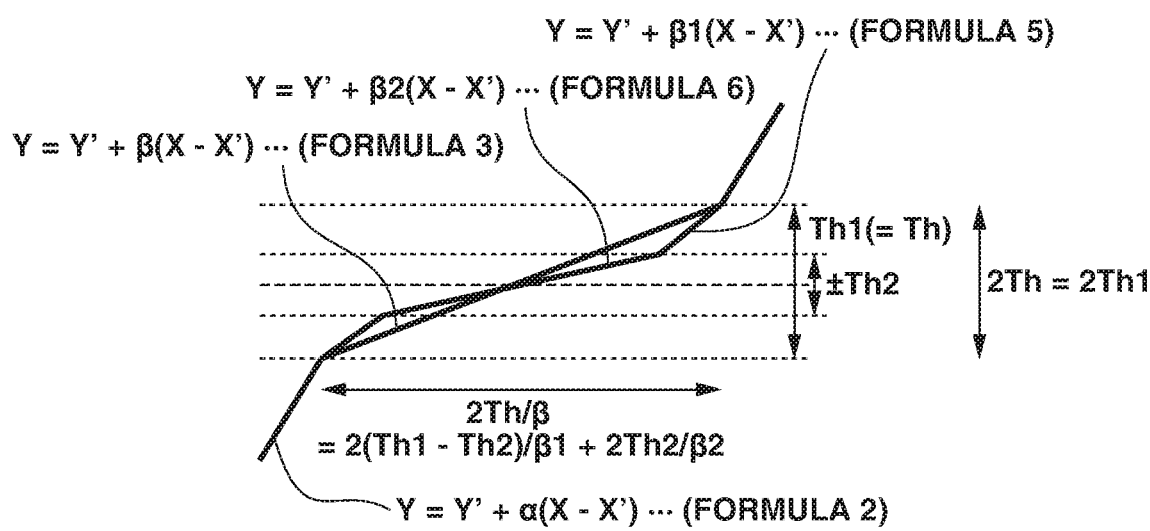

FIG. 17B illustrates the result obtained by enlarging and superimposing the variation of the focus operation command value caused by the variation of the operation amount in the vicinity of the operation target value according to the fifth exemplary embodiment illustrated in FIG. 12B and according to the present exemplary embodiment illustrated in FIG. 17A. As illustrated in FIG. 17B, the threshold value Th and the operation sensitivity β, according to the fifth exemplary embodiment and the threshold values Th1 and Th2, and the operation sensitivities β1 and β2 according to the present exemplary embodiment have relations represented by the Formulas 7 and 8.

$$Th=Th1$$ (Formula 7)

$$Th/\beta=(Th1-Th2)/\beta 1+Th2/\beta 2$$ (Formula 8)

When the relations represented by the Formulas 7 and 8 are satisfied, the operation sensitivity α according to the present exemplary embodiment is identical to the operation sensitivity α according to the fifth exemplary embodiment and can be calculated by the above-described Formula 4.

Figure 18:
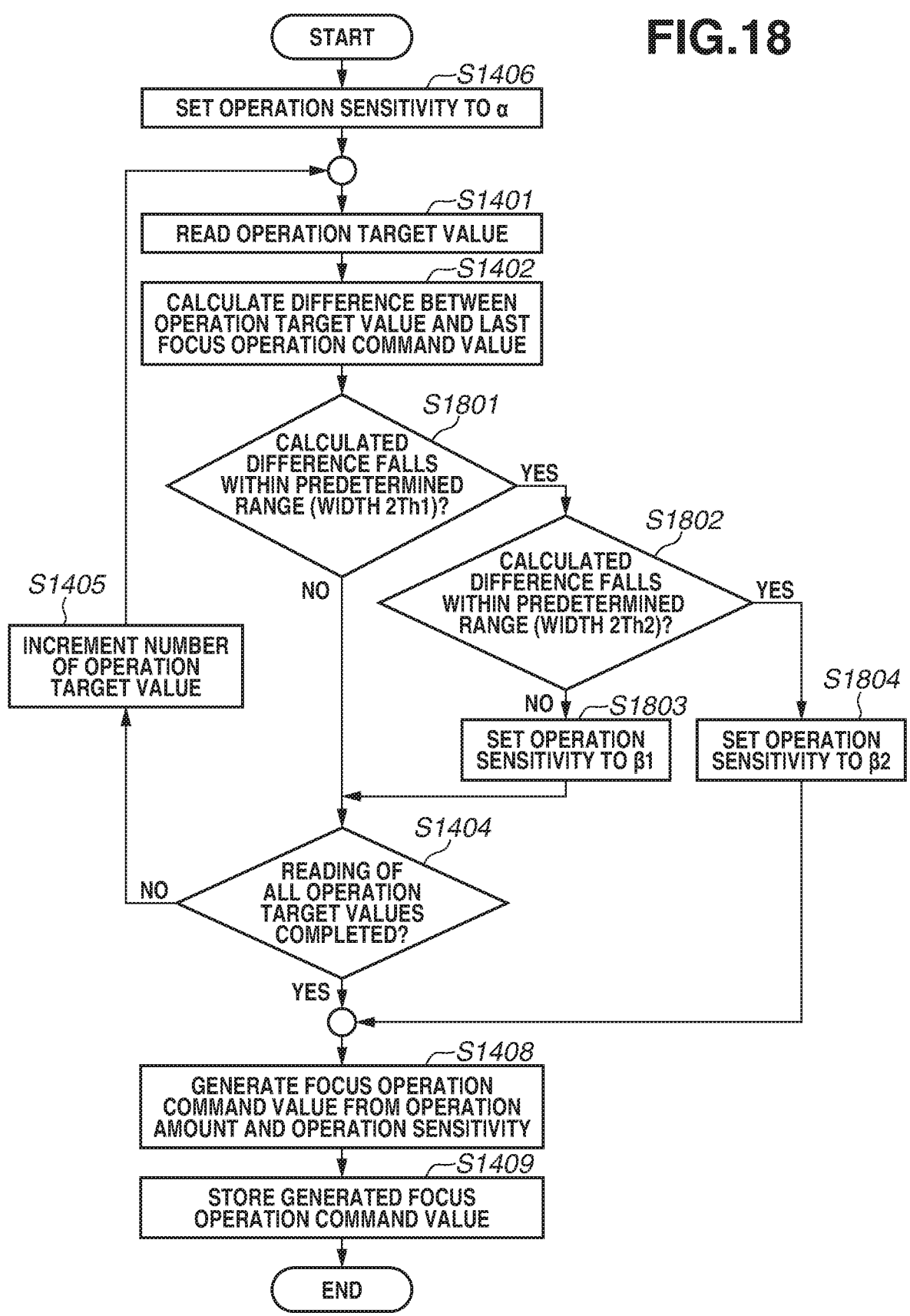
FIG. 18 is an example flowchart illustrating a part (S1305) of the processing for generating an operation command value.

FIG. 18 is a flowchart illustrating a part (step S1305 illustrated in FIG. 13) of the processing for generating an operation command value according to the present exemplary embodiment. The processing is performed when the fine adjustment mode is enabled. Referring to FIG. 18, in step S1406, the command value generation unit 103 initially sets the operation sensitivity to α. This processing sets the default operation sensitivity to α. Processing in steps S1401 and S1402 is similar to the processing according to the fifth exemplary embodiment illustrated in FIG. 14. In step S1801, the command value generation unit 103 determines whether the difference calculated in step S1402 falls within the predetermined range (within the width 2Th1). When the difference does not fall within the predetermined range (NO in step S1801), the processing proceeds to step S1404. On the other hand, when the difference falls within the predetermined range (YES in step S1801), the processing proceeds to step S1802. In step S1404, the command value generation unit 103 determines whether the reading of all of the operation target values stored in the storage unit 106 is completed. When the reading of all of the operation target values is not completed (NO in step S1404), the processing proceeds to step S1405. On the other hand, when the reading of all of the operation target values is completed (YES in step S1404), the processing proceeds to step S1408. Processing in step S1405 is similar to the processing according to the fifth exemplary embodiment illustrated in FIG. 14. In step S1802, the command value generation unit 103 determines whether the difference calculated in step S1402 falls within the predetermined range (within the width 2Th2). When the difference does not fall within the predetermined range (NO in step S1802), the processing proceeds to step S1803. On the other hand, when the difference falls within the predetermined range (YES in step S1802), the processing proceeds to step S1804.

In step S1803, the command value generation unit 103 sets the operation sensitivity to β1. In step S1804, the command value generation unit 103 sets the operation sensitivity to β2. In step S1408, the command value generation unit 103 generates the focus operation command value this time similar to that according to the fifth exemplary embodiment illustrated in FIG. 14 based on the operation amount of the operation member 101 and the set operation sensitivity. The processing is performed by using the above-described Formula 2, 5, or 6. Processing in step S1409 is similar to the processing according to the fifth exemplary embodiment illustrated in FIG. 14. Although, in the present exemplary embodiment, two different ranges (threshold values) and three different operation sensitivities have been described, the number of ranges and the number of operation sensitivities may be increased.

Thus, according to the present exemplary embodiment, for example, an operation apparatus can be provided, which advantageously operates the optical element in the vicinity of an operation target value. Further, the present exemplary embodiment can gradually change the operation sensitivity, so that the user's unnatural feeling can be reduced which may arise when the operation sensitivity is rapidly changed.

Figure 19:
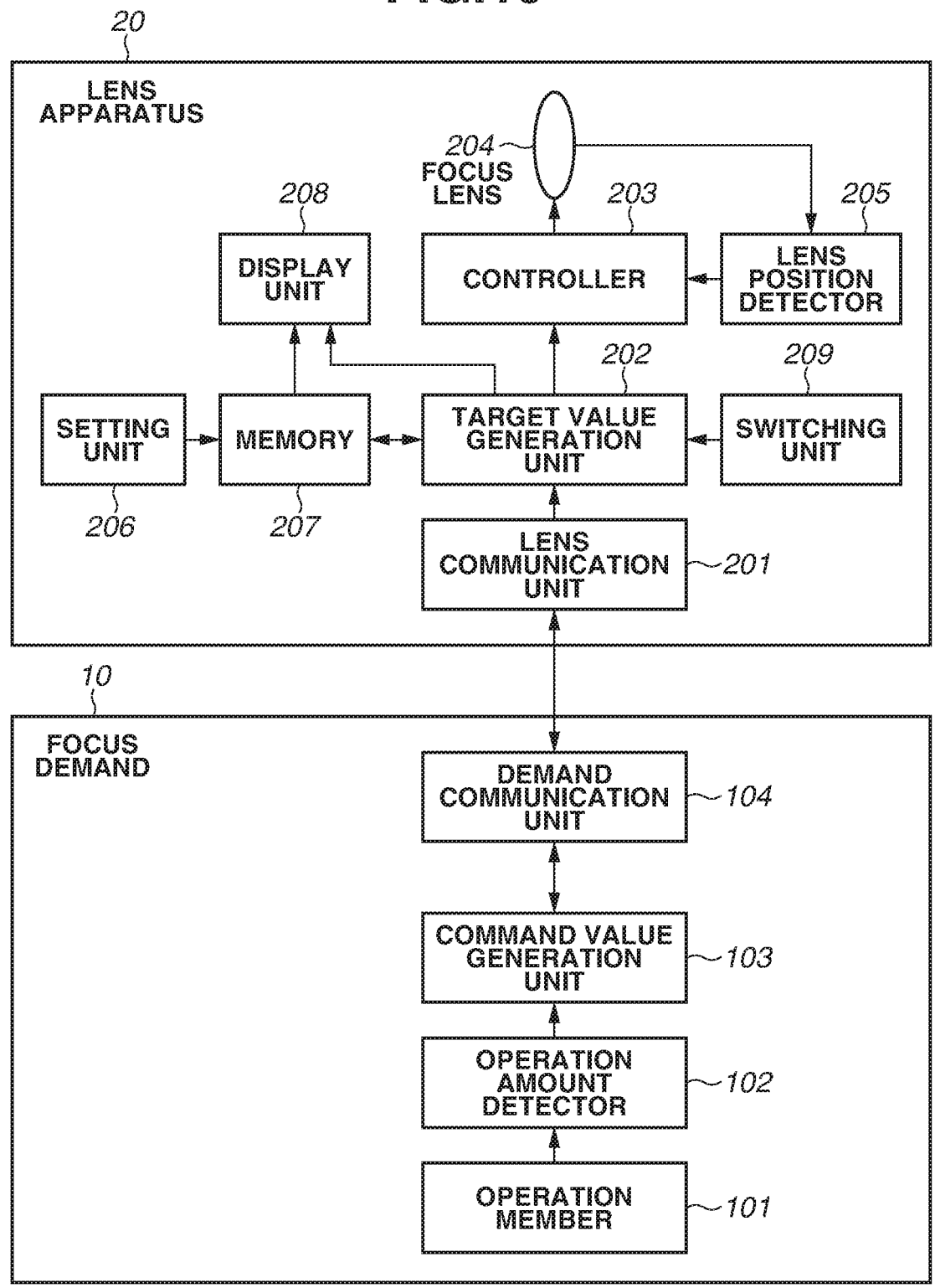
FIG. 19 illustrates examples of configurations of a lens apparatus and an operation apparatus according to an eighth exemplary embodiment.

An eighth exemplary embodiment will be described below with reference to FIG. 19. According to the fifth to the seventh exemplary embodiments, the processing for generating a focus operation command value is performed within the focus demand 10 (operation apparatus) based on the operation amount of the operation member 101. The eighth exemplary embodiment performs the processing within the lens apparatus 20. FIG. 19 illustrates configurations of the lens apparatus and operation apparatus according to the fourth exemplary embodiment. According to the present exemplary embodiment, the lens apparatus 20 includes the setting unit 206, the storage unit 207, the display unit 208, and the switching unit 209. The setting unit 206 is equivalent to the setting unit 105, the storage unit 207 is equivalent to the storage unit 106, the display unit 208 is equivalent to the display unit 107, and the switching unit 209 is equivalent to the switching unit 108. In this case, the target value generation unit 202 functions also as a main controller. The lens apparatus 20 according to the present exemplary embodiment performs processing similar to that of the focus demand 10 (operation apparatus) according to one of the fifth to the seventh exemplary embodiments and changes the operation sensitivity of the operation member 101. The lens apparatus 20 may singly operate the focus lens 204 if the lens apparatus 20 includes the function of the focus demand 10 (operation apparatus) according to one of the first to the third exemplary embodiments.

As described above, when operating the operation member 101 in the vicinity of an operation target value, the lens apparatus 20 according to the present exemplary embodiment makes it possible to change (typically decrease) the operation sensitivity of the operation member 101. Therefore, for example, it is possible to provide a lens apparatus, which advantageously operates the optical element in the vicinity of the operation target value.

[Exemplary Embodiments of Imaging Apparatus]

Figure 20:
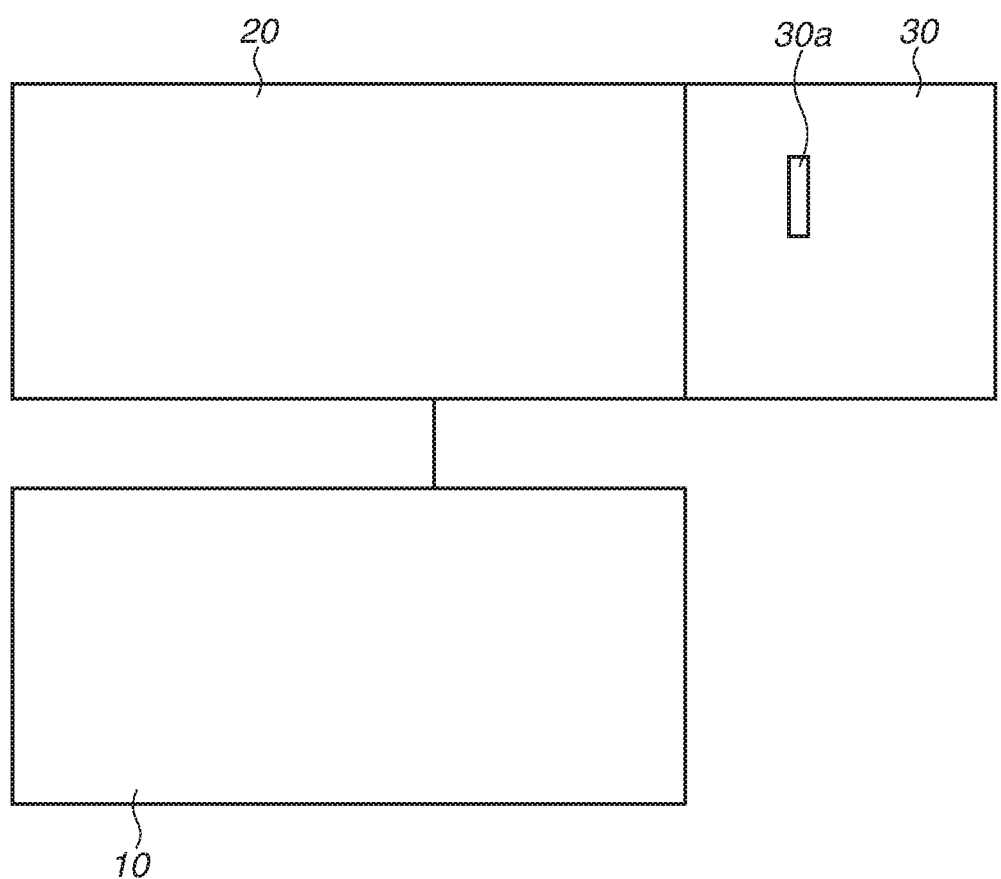
FIG. 20 illustrates an example of a configuration of an imaging apparatus.

FIG. 20 illustrates an example of a configuration of an imaging apparatus. The imaging apparatus includes the above-described operation apparatus 10 and optical apparatus (lens apparatus) 20, and a camera apparatus (imaging unit) 30 having an image sensor 30a (an imaging element) for receiving light from the optical apparatus 20. According to the present exemplary embodiment, for example, an imaging apparatus can be provided, which advantageously operates the optical element in the vicinity of an operation target value.

While the present invention has specifically been described based on the above-described preferred exemplary embodiments, the present invention is not limited thereto but can be modified in diverse ways within the ambit of the appended claims. For example, to change the subject distance, a movable lens (focus lens) is indicated as a movable optical element for changing the optical characteristic of the optical apparatus 20. However, the optical element is not limited thereto. For example, the optical element may be a movable lens for changing the focal length (magnification) or a diaphragm member with a movable stop blade for adjusting the amount of passing light. In the above-described examples of configurations, the operation sensitivity of the operation member 101 is decreased in the vicinity of an operation target value to perform the fine adjustment of the optical characteristic in the vicinity of the operation target value. However, for example, the operation sensitivity of the operation member 101 may be increased in the vicinity of the operation target value to quickly perform the fine adjustment of the optical characteristic in the vicinity of the operation target value. The display unit 107 or 208 may be provided not within the operation apparatus 10 or the lens apparatus 20, but within the camera apparatus 30. In this case, for example, the display unit 107 or 208 may be provided on the finder of the camera apparatus.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-131390, filed Jul. 4, 2017, which is hereby incorporated by reference herein in its entirety.

What is claimed is:

1. An operation apparatus for operating an optical element movable for changing an optical characteristic of an optical apparatus, the apparatus comprising:
an operation knob;
a detector configured to detect an operation amount of the operation knob;
a controller configured to generate an operation command for the optical element based on the operation amount; and
a memory configured to store an operation target for the optical element,
wherein the controller is configured to cause a display to
display the operation command and the operation target in a first region of the display corresponding to a range which the operation command can take; and
display the operation command and the operation target in a second region corresponding to a partial region in the first region in a case where the operation command and the operation target fall within a range corresponding to the partial region, the partial region being smaller than the first region, the second region being obtained by enlarging the partial region.

2. The apparatus according to claim 1, wherein the controller is configured to cause the display to display the first and second regions in parallel.

3. The operation apparatus according to claim 2, wherein the controller is configured to cause the display to display a mark indicating a region in the first region corresponding to the partial region.

4. The operation apparatus according to claim 1, wherein the controller is configured to change the partial region to be displayed in the second region based on the operation command.

5. The operation apparatus according to claim 1, wherein the controller is configured to cause the display to enlarge the partial area and display the enlarged partial area in a case where a difference between the operation target and the operation command falls within a predetermined range.

6. The operation apparatus according to claim 5, further comprising a setting device, including a switch configured to set the corresponding range.

7. The operation apparatus according to claim 1, wherein the controller is configured to differentiate a ratio of a variation of the operation command to a variation of the operation amount between the partial region and another region in the first region different from the partial region.

8. The operation apparatus according to claim 7, wherein the ratio in the partial region is smaller than the ratio in the other region.

9. The operation apparatus according to claim 1, wherein the controller is configured to cause the display to display the operation command at a center of the second region.

10. The operation apparatus according to claim 1, wherein the controller is configured to cause the display to display the operation target at a center of the second region.

11. The operation apparatus according to claim 1, wherein the controller is configured to cause the display to perform, in a case where a difference between the operation target and the operation command falls within a tolerance, display indicating the case.

12. The operation apparatus according to claim 11, further comprising a setting device, including a switch configured to set the tolerance.

13. The operation apparatus according to claim 1, wherein the operation apparatus operates the optical element movable for changing an object distance as the optical characteristic.

14. The operation apparatus according to claim 1, further comprising the display.

15. An optical apparatus comprising:
the operation apparatus defined in claim 1; and
an optical element configured to be operated by the operation apparatus.

16. An imaging apparatus comprising:
an optical apparatus comprising:
the operation apparatus defined in claim 1; and
an optical element configured to be operated by the operation apparatus, and
an image sensor configured to receive light from the optical apparatus.

* * * * *